(«12») United States Patent
Mizuno

(10) Patent No.: US 10,090,526 B2
(45) Date of Patent: Oct. 2, 2018

(54) NON-AQUEOUS ELECTROLYTE SECONDARY BATTERY AND METHOD FOR PRODUCING THE SAME

(71) Applicant: TOYOTA JIDOSHA KABUSHIKI KAISHA, Toyota-shi, Aichi (JP)

(72) Inventor: Tomoyuki Mizuno, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 308 days.

(21) Appl. No.: 14/900,392

(22) PCT Filed: Jun. 24, 2014

(86) PCT No.: PCT/JP2014/066614
§ 371 (c)(1),
(2) Date: Dec. 21, 2015

(87) PCT Pub. No.: WO2014/208517
PCT Pub. Date: Dec. 31, 2014

(65) Prior Publication Data
US 2016/0156037 A1 Jun. 2, 2016

(30) Foreign Application Priority Data

Jun. 24, 2013 (JP) .................................. 2013-132030

(51) Int. Cl.
*H01M 4/62* (2006.01)
*H01M 10/0525* (2010.01)
(Continued)

(52) U.S. Cl.
CPC ........... *H01M 4/62* (2013.01); *H01M 4/0404* (2013.01); *H01M 4/0471* (2013.01); *H01M 4/13* (2013.01);
(Continued)

(58) Field of Classification Search
CPC .... H01M 4/62; H01M 4/0404; H01M 4/0471; H01M 4/70; H01M 4/13; H01M 4/139;
(Continued)

(56) References Cited

U.S. PATENT DOCUMENTS

2003/0099880 A1\* 5/2003 Park ....................... H01M 2/26
429/211
2005/0284750 A1 12/2005 Nishimura et al.
(Continued)

FOREIGN PATENT DOCUMENTS

CN 102447088 A 5/2012
CN 102629678 A 8/2012
(Continued)

*Primary Examiner* — Ula C Ruddock
*Assistant Examiner* — Matthew W Van Oudenaren
(74) *Attorney, Agent, or Firm* — Sughrue Mion, PLLC

(57) ABSTRACT

A non-aqueous electrolyte secondary battery in which, even when a current collector terminal is welded to a current collector part, separation of the constituent materials and detachment of the mixture layer are effectively suppressed. A method by which the secondary battery can be produced with high productivity and at lower cost. A non-aqueous electrolyte secondary battery having a layered structure in which power-generating components including an electrode are layered. The electrode includes an electrode current collector and an electrode mixture layer provided in a part of the electrode current collector, which includes a current collector part not provided with the electrode mixture layer of the electrode current collector, and the current collector part includes a weld section welded to the current collector part of another electrode current collector adjacent in a layering direction. The current collector part includes a vibration-absorbing member between the weld section and the electrode mixture layer.

13 Claims, 7 Drawing Sheets

(51) Int. Cl.
  *H01M 10/0585* (2010.01)
  *H01M 10/0587* (2010.01)
  *H01M 4/04* (2006.01)
  *H01M 4/70* (2006.01)
  *H01M 4/13* (2010.01)
  *H01M 4/139* (2010.01)
  *H01M 10/052* (2010.01)

(52) U.S. Cl.
  CPC .............. *H01M 4/139* (2013.01); *H01M 4/70* (2013.01); *H01M 10/052* (2013.01); *H01M 10/0525* (2013.01); *H01M 10/0585* (2013.01); *H01M 10/0587* (2013.01); *H01M 2220/30* (2013.01); *Y02T 10/7011* (2013.01)

(58) Field of Classification Search
  CPC ........... H01M 10/0525; H01M 10/052; H01M 10/0585; H01M 10/0587; H01M 2220/30

See application file for complete search history.

(56) References Cited

U.S. PATENT DOCUMENTS

| | | |
|---|---|---|
| 2009/0233177 A1 | 9/2009 | Fujita et al. |
| 2010/0203371 A1 | 8/2010 | Nagai et al. |
| 2011/0070477 A1* | 3/2011 | Fujiwara ............... H01M 2/22 429/152 |
| 2012/0082891 A1* | 4/2012 | Ahn ................... H01M 2/1673 429/211 |
| 2012/0202105 A1 | 8/2012 | Shinyashiki et al. |

FOREIGN PATENT DOCUMENTS

| | | |
|---|---|---|
| JP | 2002-367607 A | 12/2002 |
| JP | 2004-253348 A | 9/2004 |
| JP | 2005-190912 A | 7/2005 |
| JP | 2006-32112 A | 2/2006 |
| JP | 2006-339184 A | 12/2006 |
| JP | 2008-21644 A | 1/2008 |
| JP | 2009-26705 A | 2/2009 |
| JP | 2009-252392 A | 10/2009 |
| JP | 2010-282849 A | 12/2010 |
| KR | 10-2004-0022718 A | 3/2004 |
| KR | 10-2012-0034567 A | 4/2012 |

* cited by examiner (a)

(b)

NON-AQUEOUS ELECTROLYTE SECONDARY BATTERY AND METHOD FOR PRODUCING THE SAME

CROSS REFERENCE TO RELATED APPLICATIONS

This application is a National Stage of International Application No. PCT/JP2014/066614 filed Jun. 24, 2014, claiming priority based on Japanese Patent Application No. 2013-132030, filed Jun. 24, 2013, the contents of all of which are incorporated herein by reference in their entirety.

TECHNICAL FIELD

The present invention relates to a secondary battery provided with a non-aqueous electrolyte solution. More specifically, the present invention relates to a non-aqueous electrolyte secondary battery in which electrical power is inputted and outputted via a current collector terminal welded to an electrode body, and a method for producing the same.

The present application claims priority on the basis of Japanese Patent Application No. 2013-132030, which was filed on 24 Jun. 2013, and the entire contents of that application are incorporated by reference in the present specification.

BACKGROUND ART

In recent years, non-aqueous electrolyte secondary batteries such as lithium ion secondary batteries and nickel hydrogen batteries have been used as so-called portable power sources for personal computers, hand-held terminals, and the like, and as power supplies for vehicle propulsion. In particular, lightweight lithium ion secondary batteries able to achieve high energy densities can be advantageously used as high output power sources for propelling vehicles such as electric vehicles, hybrid vehicles and plug-in hybrid vehicles.

In such non-aqueous electrolyte secondary batteries, a power-generating component is typically constituted by arranging a sheet-shaped positive electrode and a sheet-shaped negative electrode, which are obtained by providing a positive electrode mixture layer and a negative electrode mixture layer on the surface of a positive electrode current collector and a negative electrode current collector (which may be current collector foils) respectively, so as to face each other in a mutually insulated state. Such power-generating components have a layered structure obtained by winding or layering. In addition, constitutions are known in which current collector parts are formed so that a positive electrode current collector or negative electrode current collector is exposed at both edges of this type of layered structure, and power is inputted and outputted from an electrode body by connecting current collector terminals to these current collector parts. Welding is typically used to connect such current collector terminals. In addition, related features are disclosed in, for example, Patent [Literature 1]

CITATION LIST

Patent Literature

[Patent Literature 1] Japanese Patent Application Publication No. 2009-026705
[Patent Literature 2] Japanese Patent Application Publication No. 2006-339184

SUMMARY OF INVENTION

Technical Problem

In the constitution disclosed in Patent Literature 1, however, constituent materials of an active substances or the like separated from a mixture layer provided in a current collector due to bending or vibration of the current collector when a current collector terminal was welded to a current collector part. For example, in cases where a current collector part (a current collector foil) is welded to a current collector terminal by means of ultrasonic welding, which can advantageously join thin metal members such as foils to each other, the current collector part and current collector terminal are continuously subjected to ultrasonic vibrations in order to bring about diffusion of metal atoms that constitute the current collector part and current collector terminal. These vibrations are transmitted as far as the mixture layer provided in the current collector, which leads to concerns regarding separation from the mixture layer of active substance particles that constitute the porous mixture layer (this is also known as so-called "powder fall-off") and the mixture layer per se detaching from the current collector.

Meanwhile, production times need to be shortened in order to produce high-capacity non-aqueous electrolyte secondary batteries at lower cost. An effective means for shortening production times is to reduce the quantity of solvent in an electrode mixture coated on a current collector when producing a positive electrode or negative electrode, thereby reducing the time required to dry the coated electrode mixture layer. Therefore, investigations have been carried out into methods for producing non-aqueous electrolyte secondary batteries by reducing the quantity of solvent in electrode mixtures or by not using solvents at all. However, by reducing the quantity of solvent, defects in terms of the dispersion of binders in electrode mixtures readily occur, fluctuations occur in the state of integration of materials such as electrode active substances that constitute mixture layers, and the probability of active substance particle separation and mixture layer detachment during welding significantly increases.

In view of such circumstances, an objective of the present invention is to provide, for example, a non-aqueous electrolyte secondary battery in which, even when a current collector terminal is welded to a current collector part using a method that involves vibrations, such as ultrasonic welding, separation of the constituent materials of a mixture layer and detachment of the mixture layer are effectively suppressed. Another related objective is to provide a method by which such a secondary battery can be produced with high productivity and at lower cost.

Solution to Problem

In order to solve the problems mentioned above, the present invention provides a non-aqueous electrolyte secondary battery having a layered structure in which power-generating components including an electrode are layered. In this non-aqueous electrolyte secondary battery, the electrode includes an electrode current collector and an electrode mixture layer provided in a part of the electrode current collector. The electrode current collector includes a current collector part that is not provided with the electrode mixture layer of the electrode current collector. The current collector part includes a weld section that is welded to the current collector part of another electrode current collector that is adjacent in the layering direction. In addition, the current collector part is characterized by being provided with a vibration-absorbing member between the weld section and the electrode mixture layer. Typically, this weld section can be a weld section formed by welding a current collector terminal to the outermost surface of each of a plurality of power-generating components in a layered structure. Therefore, cases in which the molten metal of the weld section corresponds to the composition of the electrode current collector and cases in which the molten metal of the weld section consists of components of the electrode current collector and the current collector terminal are to be considered. It is preferable for the vibration-absorbing member to be provided only in a part of a region between the weld section and the electrode mixture layer.

Because the vibration-absorbing member is provided between the electrode mixture layer and the weld section in the constitution described above, transmission of shocks or vibrations to the electrode mixture layer can be suppressed when, for example, welding current collector parts in the layering direction when joining current collector terminals. In addition, by providing the vibration-absorbing member in the current collector part, bending of the current collector part due to vibrations can be suppressed. Therefore, the present invention provides a non-aqueous electrolyte secondary battery provided with a high quality electrode mixture layer in which separation of constituent materials of an active substance or the like from a mixture layer provided on a current collector and detachment of the mixture layer per se, which are caused by shocks, vibrations or bending, are reduced. In addition, when this non-aqueous electrolyte secondary battery is subjected to high rate charging and discharging, even if loosened or detached electrode mixture layer constituent materials are present, it is possible to suppress discharge of these materials to outside the electrode due to the presence of the vibration-absorbing member, and it is possible to achieve the effect of reducing high rate degradation.

In another aspect, the present invention provides a method for producing the non-aqueous electrolyte secondary battery described above. This production method is characterized by including the following steps: preparing the electrode current collector, an electrode mixture for forming the electrode mixture layer, and a vibration-absorbing member-forming composition for forming the vibration-absorbing member; forming the electrode mixture layer by supplying the electrode mixture to the electrode current collector while allowing the current collector part to remain unsupplied with electrode mixture; preparing the electrode by forming the vibration-absorbing member on the current collector part of the electrode current collector by supplying the vibration-absorbing member-forming composition to a part of a region between the weld section and the electrode mixture layer while allowing at least the weld section to remain unsupplied with the composition; constructing a layered structure by layering a plurality of power-generating components that include the electrode; welding, at the weld section, the current collector part of the layered structure to the current collector part of another electrode current collector that is adjacent in the layering direction; welding the current collector terminal to the weld section, which was allowed to remain unsupplied with the composition in the current collector part; and constructing a non-aqueous electrolyte secondary battery provided with the layered structure. Moreover, it is preferable for the welding to be ultrasonic welding.

According to this constitution, because the vibration-absorbing member is reliably formed between the weld section and the electrode mixture layer before the current collector terminals are joined and the current collector parts are welded in the layering direction, it is possible to produce a non-aqueous electrolyte secondary battery in which shocks and vibrations that occur during welding are reliably prevented from being transmitted from the weld section to the electrode mixture layer.

In addition, ultrasonic welding (also called ultrasonic pressure welding) typically involves sandwiching materials to be welded between horns or anvils and applying ultrasonic vibrations while applying pressure, thereby subjecting solid phase surfaces of the materials to be welded to solid phase bonding. This type of ultrasonic welding involves a lower welding temperature than resistance welding or the like, and therefore has less thermal impact on materials being welded and can be used to weld thin materials such as foils, but because vibrations occur during welding, there is the problem of these vibrations being transmitted to materials being welded. In particular, when welding an electrode current collector provided with a relatively brittle electrode mixture layer, there are concerns regarding problems such as powder fall-off from the electrode mixture layer and loosening or detachment of the electrode mixture layer.

Because the production method of the present invention can effectively suppress shocks and vibrations during welding, the use of ultrasonic welding to bond a current collector part to a current collector terminal in an electrode is preferred because the effects achieved thereby are significant. Therefore, the present invention provides a production method able to ameliorate problems such as powder fall-off from the electrode mixture layer and loosening or detachment of the electrode mixture layer even in cases where the non-aqueous electrolyte secondary battery is produced using an ultrasonic welding process.

In a preferred aspect of the non-aqueous electrolyte secondary battery disclosed here, the vibration-absorbing member is characterized by being formed in such a way that the length of the vibration-absorbing member in a direction along the boundary between the electrode mixture layer and the current collector part is equal to or greater than the length of the weld section in this direction and shorter than the length of the electrode current collector in this direction.

In this constitution, because the vibration-absorbing member is disposed in such a way as to cut across the pathway by which shocks and vibrations that occur during welding are directly transmitted to the electrode mixture layer, shocks and vibrations can be efficiently suppressed by the vibration-absorbing member. In addition, by setting the length of the vibration-absorbing member in a direction that cuts across this transmission pathway to be less than the width of the electrode current collector, impregnation of an electrolyte solution into the electrode mixture layer is not greatly impaired even in cases where a non-aqueous electrolyte solution is used as an electrolyte. Therefore, a non-aqueous electrolyte secondary battery provided with a higher quality electrode is provided.

In addition, the invention disclosed here also provides a method for producing such a non-aqueous electrolyte secondary battery.

In a preferred aspect of the non-aqueous electrolyte secondary battery disclosed here, the vibration-absorbing member is characterized by being formed in a band-like manner in the direction along the boundary mentioned above so as to be in contact with the electrode mixture layer.

According to this constitution, it is possible to reliably suppress transmission of shocks and vibrations that occur during welding to the vibration-absorbing member, and it is possible to prevent separation of constituent materials at the edge of the electrode mixture layer and detachment of the electrode mixture layer. In this way, a non-aqueous electrolyte secondary battery having a higher quality electrode mixture layer is provided.

In addition, the invention disclosed here also provides a method for producing such a non-aqueous electrolyte secondary battery.

In a preferred aspect of the non-aqueous electrolyte secondary battery disclosed here, the electrode is characterized by including a positive electrode in which a positive electrode mixture layer is formed on a surface of a positive electrode current collector, and characterized in that the thickness of the vibration-absorbing member provided in the positive electrode is at least 50% of the thickness of the positive electrode mixture layer.

According to this constitution, even if vibrations occur when, for example, an electrode is welded to a current collector terminal, the quantity of constituent material that separates from the positive electrode mixture layer (the degree of powder fall-off) can be greatly reduced. For example, the degree of powder fall-off can be reduced to approximately one tenth or less of the degree of powder fall-off that occurs in cases where a vibration-absorbing member is not provided. In this way, a non-aqueous electrolyte secondary battery having a higher quality positive electrode mixture layer is provided.

In addition, the invention disclosed here also provides a method for producing such a non-aqueous electrolyte secondary battery.

In a preferred aspect of the non-aqueous electrolyte secondary battery disclosed here, the electrode is characterized by including a negative electrode in which a negative electrode mixture layer is formed on a surface of a negative electrode current collector, and characterized in that the thickness of the vibration-absorbing member provided in the negative electrode is equal to or more than 45% of the thickness of the negative electrode mixture layer.

According to this constitution, even if vibrations occur when, for example, an electrode is welded to a current collector terminal, the quantity of constituent material that separates from the negative electrode mixture layer (the degree of powder fall-off) can be greatly reduced. For example, the degree of powder fall-off can be reduced to approximately one tenth or less of the degree of powder fall-off that occurs in cases where a vibration-absorbing member is not provided. In this way, a non-aqueous electrolyte secondary battery having a higher quality negative electrode mixture layer is provided.

In addition, the invention disclosed here also provides a method for producing such a non-aqueous electrolyte secondary battery.

In a preferred aspect of the non-aqueous electrolyte secondary battery disclosed here, the vibration-absorbing member is characterized by having a porous structure constituted from resin particles that are not oxidized at a voltage of driving the electrode.

According to this constitution, a shock- and vibration-buffering effect can be achieved by the vibration-absorbing member, and because the vibration-absorbing member is a porous structure, it is possible to improve the state of impregnation of an electrolyte solution in cases where a non-aqueous electrolyte solution is used as an electrolyte while suppressing discharge of loosened or detached constituent materials of the electrode mixture layer. Therefore, a non-aqueous electrolyte secondary battery provided with a higher quality electrode mixture layer, which can be expected to achieve a good state of electrolyte solution impregnation and good output characteristics, is provided. In addition, because the vibration-absorbing member is formed as a porous structure by means of resin particles, the vibration-absorbing member can be made to be relatively lightweight, and it is possible to prevent an increase in the weight of the non-aqueous electrolyte secondary battery.

Moreover, by using particles consisting of a thermoplastic resin as these resin particles and bonding the particles to each other by means of, for example, fusion bonding or the like, it is possible to form the vibration-absorbing member without using a binder. Preferably, this type of thermoplastic resin is polyethylene or polypropylene, and in particular polypropylene.

In addition, the invention disclosed here also provides a method for producing such a non-aqueous electrolyte secondary battery.

In a preferred aspect of the non-aqueous electrolyte secondary battery disclosed here, the battery is characterized in that the porosity of the vibration-absorbing member is 60% or lower.

The vibration-absorbing member is a porous structure, and therefore prevents penetration of an electrolyte solution from being impaired, but in order to achieve a satisfactory shock- and vibration-suppressing effect, it is desirable for the porosity to be 60% or lower, as mentioned above. Therefore, a non-aqueous electrolyte secondary battery provided with a high quality electrode mixture layer, in which a good balance is achieved between a vibration-buffering effect and an electrolyte solution penetration impairment suppression effect, is provided.

In addition, the invention disclosed here also provides a method for producing such a non-aqueous electrolyte secondary battery.

Moreover, the "porosity ($\varepsilon$)" in the present specification is defined as the value calculated using the formula below when a sample that is cut to a prescribed size from a vibration-absorbing member disposed on an electrode surface is measured, with the measured area being denoted by S, the thickness being denoted by h, the weight being denoted by W, and the true density of the vibration-absorbing member being denoted by p.

$$\varepsilon(\%) = 100 - W \div (S \times h \times \rho)$$

Moreover, in cases where the vibration-absorbing member is constituted from a plurality of materials, the true density ($\rho$) of the vibration-absorbing member can be considered to be the sum of the values obtained by multiplying the proportion of each constituent material by the true density ($\rho n$) of each constituent material. In the present specification, the porosity ($\rho$) is calculated for a sample cut (punched) so as to have a circular shape with a diameter of 3 mm.

In a preferred aspect of the non-aqueous electrolyte secondary battery disclosed here, the power-generating component may be constituted from a layered electrode body obtained by layering a plurality of the positive electrodes and a plurality of the negative electrodes on each other in a mutually insulated state. Alternatively, in a preferred aspect of the non-aqueous electrolyte secondary battery disclosed here, the power-generating component may be constituted from a wound electrode body in which a layered structure is formed by overlaying and winding a long sheet-shaped positive electrode and a long sheet-shaped negative electrode on each other in a mutually insulated state. In at least one of the positive electrode and negative electrode in these electrode bodies, the current collector part is joined in an integrated manner at the weld section in the layering direction of the electrode. For example, current collector terminals are joined by means of welding at the outermost weld section of this integrated current collector part. In a non-aqueous electrolyte secondary battery having this type of constitution also, a vibration-absorbing member is disposed between the weld section and the electrode mixture layer in each electrode.

According to this constitution, because a vibration-absorbing member is disposed in each of the plurality of electrodes, transmission to the electrode mixture layer of shocks and vibrations that occur during welding can be reliably suppressed in each electrode. Therefore, because a current collector terminal is welded to an electrode body provided with a layered structure having a large number of layers, even if the magnitude of shocks and vibrations increase due to the input power increasing during welding or if the welding period increases, powder fall-off from the mixture layer and loosening or detachment of the mixture layer can be advantageously suppressed. In this way, a non-aqueous electrolyte secondary battery provided with a high quality layered electrode body or wound electrode body is provided.

In addition, the invention disclosed here also provides a method for producing such a non-aqueous electrolyte secondary battery.

DESCRIPTION OF EMBODIMENTS

Figure 1:
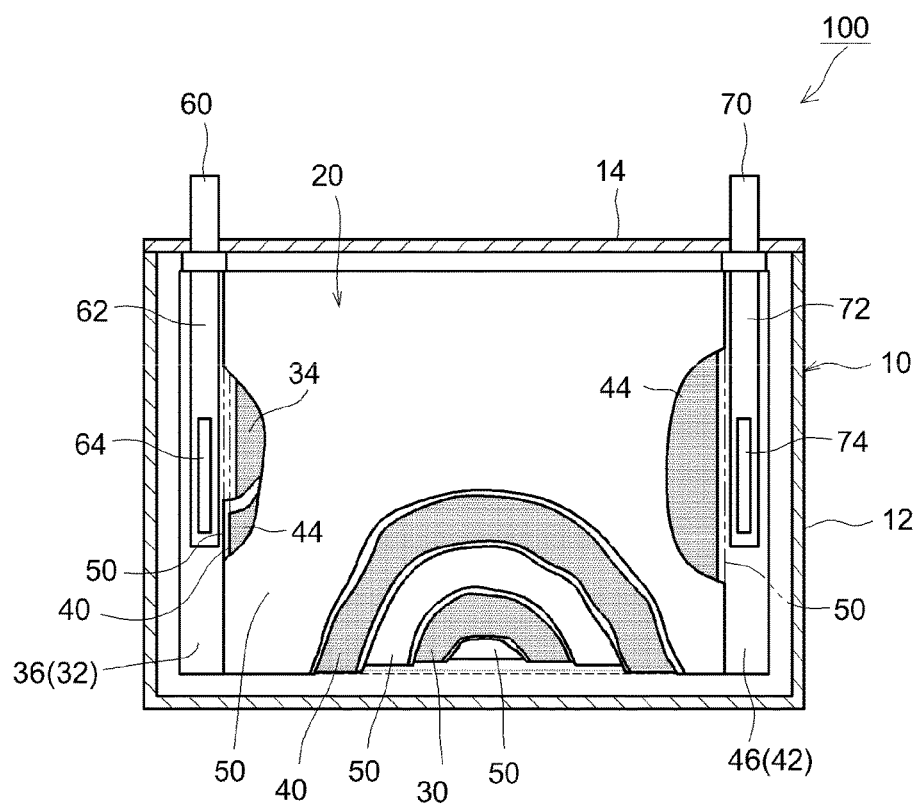
FIG. 1 is a longitudinal sectional view that schematically illustrates the cross sectional structure of a non-aqueous electrolyte secondary battery according to one embodiment.

Preferred embodiments of the present invention will now be explained while referring to the drawings as appropriate. Matters which are essential for carrying out the invention and which are matters other than those explicitly mentioned in the present specification are matters that a person skilled in the art could understand to be matters of design on the basis of the prior art in this technical field. The present invention can be carried out on the basis of the matters disclosed in the present specification and common general technical knowledge in this technical field. Moreover, in the drawings shown below, components/parts that perform the same action are denoted by the same symbols, and duplicate explanations will be omitted or simplified. In addition, dimensions shown in the drawings (lengths, widths, thicknesses, and so on) do not necessarily reflect actual dimensions.

Although not intending to place particular limitations on the present invention, the constitution of a non-aqueous electrolyte secondary battery according to the present invention will now be explained in detail by using, as an example, a non-aqueous electrolyte secondary battery 100 that is a preferred embodiment, as shown in FIGS. 1 to 6. The non-aqueous electrolyte secondary battery 100 shown in FIG. 1 has a form whereby a wound electrode body 20, which is wound into a flat shape, and a non-aqueous electrolyte (not shown) are housed in a battery case 10 having a flat rectangular shape. In addition, the non-aqueous electrolyte secondary battery 100 provided by the present invention is essentially constituted so as to include a layered structure obtained by layering power-generating components that include electrodes 30 and 40. Here, the power-generating components can typically be constituted by disposing positive electrodes 30 and negative electrodes 40 so as to face each other in a mutually insulated state. In addition, the layered structure obtained by layering these power-generating components s can typically be achieved by means of an electrode body 20 having a layered structure in which positive electrodes 30 and negative electrodes 40 are layered on each other. Typically, the non-aqueous electrolyte secondary battery 100 is provided with this electrode body 20 and current collector terminals 62 and 72, which are used to output power from the electrode body 20.

Figure 2:
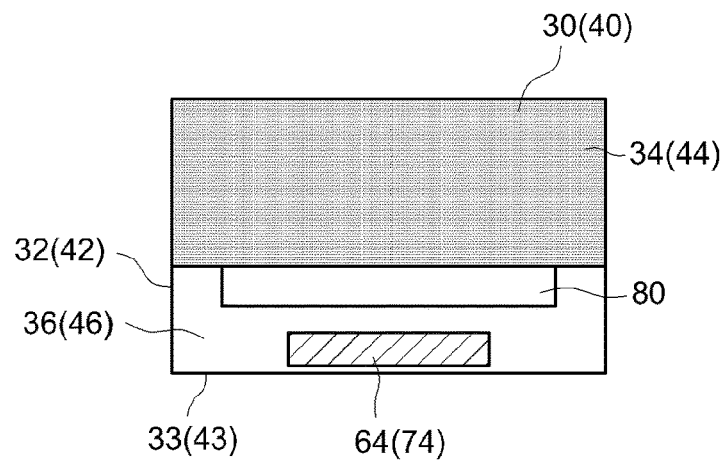
FIG. 2 is a planar view showing an example of a constitution of an electrode according to one working example.

In addition, FIG. 2 is a diagram showing an embodiment of an electrode 30 or 40 in a constitution that is characteristic of the non-aqueous electrolyte secondary battery 100 of the present invention. The positive electrode 30 in the non-aqueous electrolyte secondary battery 100 of the present invention includes a positive electrode current collector 32 and a positive electrode mixture layer 34 that is provided on a part of the positive electrode current collector 32. This positive electrode current collector 32 has a positive electrode current collector part 36 that is not provided with the positive electrode mixture layer 34, and the positive electrode current collector part 36 includes a weld section 64, which is formed by welding the positive electrode current collector part 36 to the current collector part 36 of another positive electrode current collector 32 that is adjacent in the layering direction. In addition, the negative electrode 40 includes a negative electrode current collector 42 and a negative electrode mixture layer 44 that is provided on a part of the negative electrode current collector 42. This negative electrode current collector 42 has a negative electrode current collector part 46 that is not provided with the negative electrode mixture layer 44, and the negative electrode current collector part 46 includes a weld section 74, which is formed by welding the negative electrode current collector part 46 to the current collector part 46 of another negative electrode current collector 42 that is adjacent in the layering direction. In addition, in a layered structure obtained by layering power-generating components that include electrodes 30 and 40 having these constitutions, a positive electrode current collector terminal 62 is typically joined by means of welding to the positive electrode current collector part 36 at the weld section 64 provided at a part of the outermost positive electrode current collector part 36. In addition, a negative electrode current collector terminal 72 is joined by means of welding to the negative electrode current collector part 46 at the weld section 74 provided at a part of the outermost negative electrode current collector part 46.

In addition, a vibration-absorbing member 80 is provided between the weld section 64 and the positive electrode mixture layer 34 in the positive electrode current collector part 36. In addition, a vibration-absorbing member 80 is provided between the weld section 74 and the negative electrode mixture layer 44 in the negative electrode current collector part 46. This vibration-absorbing member 80 is provided only in a part of a region between the weld section 64 or 74 and the electrode mixture layer 34 or 44. That is, a section in which the current collector part 36 or 46 is exposed is allowed to remain in the region between the weld section 64 or 74 and the electrode mixture layer 34 or 44. Moreover, the vibration-absorbing member 80 is provided on both surfaces of all the electrode current collectors 32 and 42 in FIG. 3, but the present invention is not limited to such an embodiment. For example, it is possible for the vibration-absorbing member 80 to be provided on only some of the electrode current collectors 32 and 42. In addition, it is possible for the vibration-absorbing member 80 to be provided on only one surface of some or all of the electrode current collectors 32 and 42. For example, it is possible for the vibration-absorbing member not to be provided on the outermost electrode current collectors 32 and 42.

By providing the vibration-absorbing member 80 between the weld section 64 or 74 and the electrode mixture layer 34 or 44 in this way, it is possible to reliably reduce the magnitude of shocks and vibrations that are transmitted from the weld sections 64 and 74 to the electrode mixture layers 34 and 44 (hereinafter also referred to simply as a "vibration-absorbing effect"). For example, it is possible to suppress the transmission of shocks and vibrations, which occur when welding the electrode terminals 62 and 72 at the weld sections 64 and 74, from the weld sections 64 and 74 to the electrode mixture layers 34 and 44. In addition, it is possible to suppress the transmission of shocks and vibrations from the outside (outside the battery case 10) to the electrode mixture layers 34 and 44 via the electrode terminals 62 and 72. That is, in the present invention, the vibration-absorbing member 80 can be understood to be a structural member that exhibits a vibration-isolating effect that prevents breakage or damage of the electrode mixture layers 34 and 44 by any type of unwanted external shocks and vibrations.

Moreover, in the case shown in FIG. 2, the vibration-absorbing member 80 is formed in such a way that the length of the vibration-absorbing member in a direction along the boundary between the electrode mixture layer 34 or 44 and the current collector part 36 or 46 is at least as long as the length of the weld section 64 or 74 in this direction and shorter than the length of the electrode current collector 32 or 42 in this direction. In this way, the vibration-absorbing member 80 can suppress shocks and vibrations that are directly transmitted from the weld sections 64 and 74 to the electrode mixture layers 34 and 44 and suppress shocks and vibrations that are transmitted in a somewhat diffused manner from the weld sections 64 and 74 to the electrode mixture layers 34 and 44, and it is possible to achieve a higher vibration-absorbing effect. Furthermore, the vibration-absorbing member 80 is formed in a band-like manner along the boundary between the electrode mixture layer 34 or 44 and the current collector part 36 or 46 so as to be in contact with the electrode mixture layer 34 or 44. Forming the vibration-absorbing member in this way is preferred from the perspective of being able to more reliably reduce shocks and vibrations transmitted from the weld sections 64 and 74 to the electrode mixture layers 34 and 44. In addition, by forming the vibration-absorbing member 80 so as to be adjacent to the electrode mixture layer 34 or 44, it is possible to achieve the effect of suppressing separation of mixture layer constituent materials at the edges of a relatively brittle electrode mixture layer 34 or 44 and suppressing detachment of the mixture layer 34 or 44. Furthermore, forming the vibration-absorbing member 80 so as to be adjacent to the electrode mixture layers 34 and 44 has the advantage of being able to easily form the vibration-absorbing member 80 with a high thickness.

Figure 4:
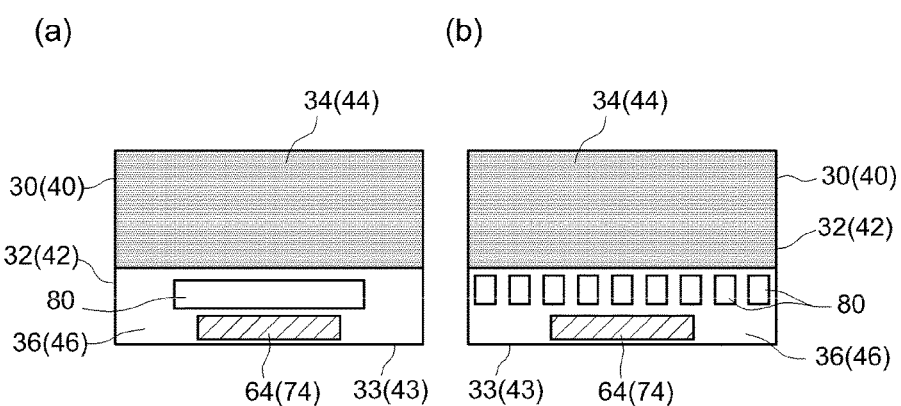
FIGS. 4 (*a*) and (*b*) are planar views showing examples of the manner in which a vibration-absorbing member is disposed in an electrode.

However, the vibration-absorbing member 80 is not limited to such examples, and can be formed so as to be completely separated from the electrode mixture layer 34 or 44, as shown in FIG. 4 (*a*), for example. Alternatively, the vibration-absorbing member 80 can be formed so as to be partially separated from the electrode mixture layer 34 or 44, although this is not explicitly shown in the drawings. In addition, in the case shown in FIG. 2, the vibration-absorbing member 80 is formed in a continuous band-like manner, but is not limited to this example, and can be formed in an intermittent band-like manner, as shown in FIG. 4 (*b*), for example. In order to clearly show that the vibration-absorbing member 80 is not formed continuously in FIG. 4 (*b*), sections where the vibration-absorbing member 80 is not formed are shown as being relatively broad and numerous, but the vibration-absorbing member 80 is not limited to this example, and the form of a vibration-absorbing member 80 having an intermittent band-like shape can be arbitrarily set according to the desired operation or the like.

Moreover, this type of band-like vibration-absorbing member 80 is not particularly limited, but it is generally preferable for the dimension perpendicular to the boundary between the electrode mixture layer 34 or 44 and the current collector part 36 or 46 to be 1 to 7 mm. If the vibration-absorbing member 80 is formed with such a dimension, it is possible to satisfactorily achieve the effect of suppressing the transmission of shocks and vibrations without being greatly affected by the physical structure of the battery or the like.

Moreover, the shape of the vibration-absorbing member 80 is not particularly limited and is not necessarily limited to being rectangular, and may be, for example, an irregular shape consisting of arbitrary curved shapes and patterns.

Meanwhile, because the vibration-absorbing member 80 is formed when the electrode body 20 is constructed, the vibration-absorbing member 80 can exert resistance to the penetration of a non-aqueous electrolyte solution in the case of a secondary battery 100 which uses a non-aqueous electrolyte solution as a non-aqueous electrolyte and in which the non-aqueous electrolyte solution is allowed to penetrate from the weld sections 64 and 74 in the electrode body 20 towards the electrode mixture layers 34 and 44 following construction. In such cases, it is preferable for the vibration-absorbing member 80 to be formed in such a way that the length of the vibration-absorbing member in a direction along the boundary between the electrode mixture layer 34 or 44 and the current collector part 36 or 46 is shorter than the length of the electrode current collector 32 or 42 in this direction. Here, this length can be considered to be the overall length of the vibration-absorbing member 80 in this direction. For example, in cases where the vibration-absorbing member 80 is formed in an intermittent band-like manner, this length can be taken to be the total length of the individual vibration-absorbing members 80 in this direction.

In addition, the vibration-absorbing effect of the vibration-absorbing member 80 can vary according to the volume of the vibration-absorbing member 80. That is, the vibration-absorbing effect can increase as the volume of the vibration-absorbing member 80 disposed in the electrodes 30 and 40 increases. Meanwhile, the non-aqueous electrolyte solution penetration impairment behavior can become significant as the vibration-absorbing member 80 is provided across a broader area of the region between the weld section 64 or 74 and the electrode mixture layer 34 or 44 (for example, the whole of this region). Therefore, in order to achieve a good balance between the vibration-absorbing effect and reducing the penetration impairment behavior, it is preferable for the vibration-absorbing member 80 to be formed at a higher thickness for a given volume. By forming the vibration-absorbing member 80 so as to have a high thickness, transmission of shocks and vibrations, which occur when the electrode terminals 62 and 72 are welded to the weld sections 64 and 74, to the electrode mixture layers 34 and 44 can be more effectively suppressed and the quantity of constituent material that separates from the electrode mixture layers 34 and 44 (the degree of powder fall-off) can be reduced. In addition, the non-aqueous electrolyte solution penetration impairment behavior can be advantageously suppressed. Moreover, by increasing the thickness of the vibration-absorbing member 80, it is possible to achieve the effect of suppressing discharge of the electrode mixture layers 34 and 44 from the electrode body 20 even in the unlikely event that constituent materials of the electrode mixture layers 34 and 44 become detached or loosened. This is a preferred constitution for the non-aqueous electrolyte secondary battery 100, in which high rate charging and discharging occurs, which can lead to relatively significant degradation of the electrode mixture layers 34 and 44.

The thickness of this type of vibration-absorbing member 80 is not particularly limited, but as a general guideline, it is preferable for the thickness of the vibration-absorbing member to be not less than approximately 45% of the thickness of the electrode mixture layer 34 or 44. More specifically, in cases where the electrode is the positive electrode 30, it is preferable for the vibration-absorbing member 80 to be formed at a thickness that is at least 50% (more preferably at least 55%, for example at least 60%) of the thickness of the positive electrode mixture layer 34. In addition, in cases where the electrode is the negative electrode 40, it is preferable for the vibration-absorbing member 80 to be formed at a thickness that is at least 40% (more preferably at least 48%, for example at least 50%) of the thickness of the negative electrode mixture layer 44. The upper limit of the thickness of the vibration-absorbing member 80 is not particularly limited as long as this is not a thickness that is unsuitable for constructing the electrode body 20, but if this thickness exceeds 100% of the thickness of the electrode mixture layer 34 or 44, the effect of the vibration-absorbing member rapidly reaches full capacity. Therefore, the thickness of the vibration-absorbing member 80 can be not more than approximately 150%, preferably not more than 130%, for example not more than 100%, of the thickness of the electrode mixture layer 34 or 44.

Moreover, the vibration-absorbing member 80 is not necessarily limited to that described above, but is preferably a porous structure. By making the vibration-absorbing member 80 a porous structure, it is possible to reduce the non-aqueous electrolyte solution penetration impairment behavior. In such cases, a reduction in the non-aqueous electrolyte solution penetration impairment behavior can be expected if the porosity of the vibration-absorbing member 80 exceeds 0%, but if this porosity is at least 20%, and preferably at least 30%, this impairment behavior-reducing effect becomes more pronounced. However, if the porosity is too high, the vibration suppression effect, which is the intrinsic purpose of the vibration-absorbing member 80, cannot be effectively achieved, which is not desirable. From this perspective, the porosity of the vibration-absorbing member 80 is preferably 60% or lower, for example 55% or lower, more preferably 50% or lower, and particularly preferably 40% or lower.

It is preferable for a vibration-absorbing member 80 having this type of porous structure to be constituted from resin particles that are not oxidized at the electrode driving voltage. By stacking resin particles with gaps therebetween, it is possible to adjust the porosity within the range mentioned above and advantageously form a vibration-absorbing member 80 having a porous structure. In addition, by using resin particles, it is possible to constitute the vibration-absorbing member 80 so as to be lighter than vibration-absorbing members in which other materials are used, which is desirable. Moreover, constituting a vibration-absorbing member 80 having this type of porous structure from resin particles is preferred because even in cases where the thickness of the vibration-absorbing member 80 is 100% or more of the thickness of the electrode mixture layer 34 or 44, the vibration-absorbing member 80 can be compressed to a thickness of approximately 100% with a relatively slight stress (compressive stress).

In addition, the electrode body 20 may have a constitution that includes a sheet-shaped electrode such as that shown in, for example, FIG. 2 or FIG. 4. Typically, the electrode body 20 may be a layered electrode body 20 obtained by layering a plurality of positive electrodes 30 and a plurality of negative electrodes 40 in a mutually insulated state, as shown in, for example, FIG. 5 (b). In such cases, the current collector terminals 62 and 72 may be joined by means of welding to the outermost electrodes 30 and 40. In this way, current collector parts 46 that are adjacent in the layering direction are joined at the weld section 74. In addition, depending on the desired constitution of the battery 100, at least either of the plurality of positive electrodes 30 and the plurality of negative electrodes 40 in the layered electrode body 20 may be joined to the current collector terminals 62 and 72 at the weld sections 64 and 74. In order to reduce the internal resistance and enable high current input and output, it is more preferable for the current collector terminals 62 and 72 to be connected to both the positive electrodes 30 and the negative electrodes 40. Moreover, the shape of the weld sections 64 and 74 where the current collector terminals 62 and 72 are joined is not particularly limited, and can be an arbitrary shape depending on the type of ultrasonic welding apparatus being used, and the like. Moreover, in cases where the weld sections 64 and 74 are formed in a band-like manner along the edges of the electrode current collectors 32 and 42, as shown in, for example, FIG. 2 and FIG. 4, it is preferable for the dimension in the direction perpendicular to the boundary between the electrode mixture layer 34 or 44 and the current collector part 36 or 46 to be at least 8 mm in order for welding of the current collector terminals 62 and 72 to be carried out with good precision and for good welding strength to be ensured. The upper limit for this dimension of the weld section 64 or 74 is not particularly limited, and can be set as appropriate according to, for example, the physical structure of the electrode body 20. Typically, this upper limit can be approximately 12 mm or less. The weld sections 64 and 74 may be constituted from one or two or more of the weld sections 64 and 74.

In cases where only one of the positive electrode 30 and negative electrode 40 is connected to the current collector terminal 62 or 72 at the weld section 64 or 74, the other current collector terminal 62 or 72 can, for example, be joined and contacted with the current collector part 36 or 46 so as to be perpendicular to the planar direction of the positive electrode 30 and negative electrode 40.

Figure 5:
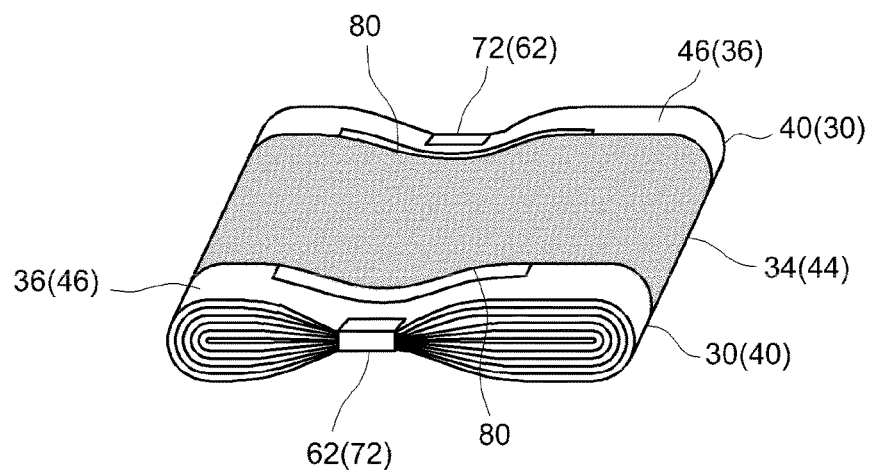
FIG. 5 shows perspective views that show the manner in which a current collector terminal is connected to (a) a wound electrode body or (b) a layered electrode body according to one embodiment.
Figure 5:
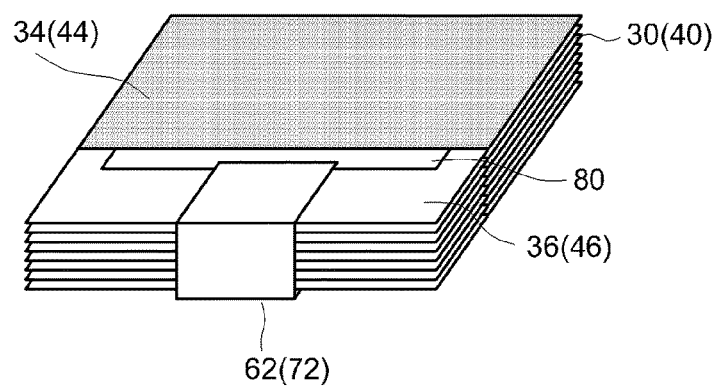
Figure 6:
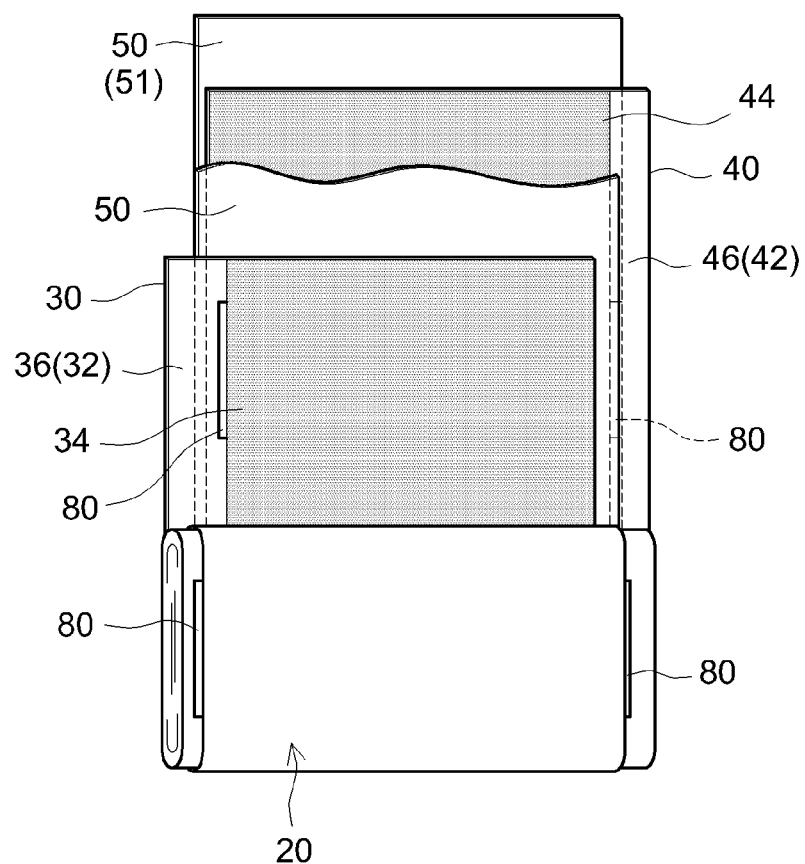
FIG. 6 is a schematic diagram that illustrates the constitution of a wound electrode body according to one embodiment.

For example, the electrode body 20 may be a wound electrode body 20 obtained by overlaying and winding a long sheet-shaped positive electrode 30 and a long sheet-shaped negative electrode 40 in a mutually insulated state, as shown in, for example, FIG. 5 (*a*) and FIG. 6. In such cases, the current collector terminals 62 and 72 can be joined to the outermost positive electrode 30 and negative electrode 40 among the positive electrodes 30 and negative electrodes 40 in the wound layered state. In this way, current collector parts 36 and 46 that are adjacent in the layering direction are joined at the weld sections 72 and 74. Moreover, the wound electrode body 20 may be a cylindrical wound electrode body 20, but may also be a flat wound electrode body 20 obtained by flatly squeezing the electrode body in a direction perpendicular to the winding axis. In addition, depending on the desired constitution of the battery 100, at least either of the plurality of positive electrodes 30 and the plurality of negative electrodes 40 in the layered electrode body 20 may be joined to the current collector terminals 62 and 72 at the weld sections 64 and 74. In order to reduce the internal resistance and enable high current input and output, it is more preferable for the current collector terminals 62 and 72 to be connected to both the positive electrodes 30 and the negative electrodes 40. The dimension of the weld section 64 or 74 in the direction perpendicular to the boundary between the electrode mixture layer 34 or 44 and the current collector part 36 or 46 can be considered to be similar to that in the case of the layered electrode body 20 described above. In the case of the wound electrode body 20, a plurality of weld sections 64 and 74 are inherently formed in a single positive electrode sheet 30 and a single negative electrode sheet 40.

Moreover, in cases where only one of the positive electrode 30 and negative electrode 40 is connected to the current collector terminal 62 or 72 at the weld section 64 or 74, the other current collector terminal 62 or 72 can, for example, be joined and contacted with the current collector terminal 62 or 72 so as to be perpendicular to the winding axis direction of the positive electrode 30 and negative electrode 40.

In a wound electrode body 20 having a layered structure obtained by layering a plurality of power-generating components consisting of a positive electrode 30 and a negative electrode 40, such as the layered or wound electrode body 20 described above, it is thought that the input during welding increases or the welding time increases when carrying out welding in order to join the current collector terminals 62 and 72 to the multi-ply layered current collector parts 36 and 46. That is, it is predicted that the magnitude of shocks and vibration will increase during welding. The non-aqueous electrolyte secondary battery of the present invention can achieve a vibration-absorbing effect, as mentioned above, and can therefore be advantageously used in a large non-aqueous electrolyte secondary battery 100 provided with a layered or wound electrode body 20 to which current collector terminals 62 and 72 are joined by welding.

A more detailed constitution of the non-aqueous electrolyte secondary battery 100 of the present invention will now be explained with reference to the non-aqueous electrolyte secondary battery 100 having a wound electrode body 20, as shown in FIG. 1 and FIG. 6, and a method for producing this battery will also be explained.

<<Method for Producing Non-Aqueous Electrolyte Secondary Battery>>

A non-aqueous electrolyte secondary battery 100 such as that described above can be advantageously produced by using a production method that includes, for example, the steps mentioned below.

(1) Preparation step: The electrode current collectors 32 and 42, electrode mixtures for forming the electrode mixture layers 34 and 44, and a vibration-absorbing member-forming composition for forming the vibration-absorbing member 80 are prepared.

(2) Electrode mixture layer formation step: The electrode mixture layers 34 and 44 are formed by supplying electrode mixtures to the electrode current collectors 32 and 42 while allowing the current collector parts 36 and 46 to remain unsupplied with electrode mixture.

(3) Vibration-absorbing member and electrode formation step: An electrode is prepared by forming the vibration-absorbing member 80 by supplying the vibration-absorbing member-forming composition to a part of the current collector parts 36 and 46 of the electrode current collectors 32 and 42 while allowing at least the weld sections 64 and 74, which are connected to the current collector terminals 62 and 72, to remain unsupplied with the composition.

(4) Electrode body construction step: The electrode body 20, which is provided with at least the electrodes 30 and 40, is constructed.

(5) Current collector terminal welding step: The current collector terminals 62 and 72 are joined by means of welding to the weld sections 64 and 74, which were allowed to remain unsupplied with the composition in the current collector parts 36 and 46.

(6) Battery construction step: The non-aqueous electrolyte secondary battery 100 provided with the electrode body 20 is constructed.

According to this production method, the non-aqueous electrolyte secondary battery 100, which is provided with higher quality electrode mixture layers 34 and 44 by providing the vibration-absorbing member 80, can be advantageously produced. Each step will now be explained in order.

[1: Preparation Step]

First, the electrode current collectors 32 and 42, electrode mixtures for forming the electrode mixture layers 34 and 44, and a vibration-absorbing member-forming composition for forming the vibration-absorbing member 80 are prepared.

<<Positive Electrode>>

An electrically conductive member consisting of a metal that exhibits good electrical conductivity (for example, aluminum, nickel, titanium or stainless steel) can be advantageously used as the positive electrode current collector 32. In the example shown in FIG. 6, a long sheet-shaped positive electrode current collector 32 is used.

Typically, the positive electrode mixture can be one obtained by preparing a paste-like or slurry-like composition having an appropriate viscosity (concentration) by dispersing, for example, a positive electrode active substance and positive electrode mixture layer constituent materials, which are used according to need, in an appropriate solvent. In addition, it is also possible to use a powdery mixture obtained by complexing a positive electrode active substance and positive electrode mixture layer constituent materials that are used according to need.

One or two or more types of material that are known to be able to be used as positive electrode active substances of non-aqueous electrolyte secondary batteries can be used without particular limitation as the positive electrode active substance. Preferred examples thereof include layered spinel type lithium complex metal oxides (for example, $LiNiO_2$, $LiCoO_2$, $LiFeO_2$, $LiMn_2O_4$, $LiNi_{0.5}Mn_{1.5}O_4$, $LiCrMnO_4$ or $LiFePO_4$).

A preferred aspect is a lithium-nickel-cobalt-manganese composite oxide containing Li, Ni, Co and Mn and having a layered structure (typically a layered rock salt structure belonging to the hexagonal system) (for example, $LiNi_{1/3}Co_{1/3}Mn_{1/3}O_2$). This type of compound exhibits excellent thermal stability and can achieve a higher energy density than other materials.

Here, a lithium-nickel-cobalt-manganese composite oxide also encompasses oxides that contain at least one type of metal element other than Li, Ni, Co and Mn (that is, a transition metal element and/or typical metal element other than Li, Ni, Co and Mn) in addition to oxides containing only Li, Ni, Co and Mn as constituent metal elements. Such metal elements include one or two or more types selected from among magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pb), platinum (Pt), copper (Cu), zinc (Zn), boron (B), aluminum (Al), gallium (Ga), indium (In), tin (Sn), lanthanum (La) and cerium (Ce). The added quantity (blending quantity) of these metal elements is not particularly limited, but can generally be 0.01 to 5 mass % (for example, 0.05 to 2 mass %, and typically 0.1 to 0.8 mass %). By setting the added quantity to fall within this range, it is possible to achieve excellent battery characteristics (for example, high energy density).

In addition, a lithium-transition metal composite oxide having a spinel structure, which is represented by the general formula $LiMn_{2-p}M_pO_4$ (in the formula, p is such that $0 \le p < 2$, and typically such that $0 \le p \le 1$ (for example, $0.2 \le p \le 0.6$), can be given as another preferred aspect. In cases where p is greater than 0, M may be a metal element other than Mn or a non-metal element. A composition in which M includes at least one type of transition metal element (for example, one or two or more elements selected from among Ti, Cr, Fe, Co, Ni, Cu and Zn) is preferred. By using such a compound, it is possible to set the operating potential of the positive electrode to be approximately 4.5 V or higher (and especially 4.6 V or higher, for example, 4.7 V or higher), which is higher than that in a conventional non-aqueous electrolyte secondary battery (in which the upper limit for the operating potential is approximately 4.1 to 4.2 V). Therefore, a significantly higher energy density can be achieved.

In addition to the positive electrode active substance, the positive electrode mixture layer 34 may, if necessary, contain one or two or more materials able to be used as constituent components of positive electrode mixture layers 34 in ordinary non-aqueous electrolyte secondary batteries. Examples of such materials include electrically conductive materials and binders. Electrically conductive materials able to be advantageously used include carbon materials, such as various types of carbon black (typically acetylene black and ketjen black), coke coal, activated carbon, graphite, carbon fibers and carbon nanotubes. In addition, a vinyl halide-based resin such as poly(vinylidene fluoride) (PVdF); a poly(alkylene oxide) such as poly(ethylene oxide) (PEO), or the like can be advantageously used as a binder.

The solvent used to disperse the materials that constitute the paste-like positive electrode mixture can be any aqueous solvent or organic solvent that is suitable for the properties of the binder being used, and an example of a solvent able to be advantageously used is N-methyl-2-pyrrolidone (NMP).

The solid content concentration in the positive electrode mixture is not particularly limited, and can be adjusted to approximately 50 to 85 mass %. In the invention disclosed here, because powder fall-off from the positive electrode mixture layer 34 is reduced by the presence of the vibration-absorbing member 80, it is possible to prepare the positive electrode mixture while reducing the quantity of solvent compared to ordinary positive electrode mixtures, in other words, by increasing the solid content concentration. An example of this type of high solid content concentration is 65 to 85 mass %, for example 75 to 80 mass %.

In addition, the proportion of the positive electrode active substance relative to the solid content of the positive electrode mixture should be approximately 60 mass % or higher (typically 60 to 99 mass %), and it is generally preferable for this proportion to be approximately 70 to 95 mass %. In cases where an electrically conductive material is used, the proportion of the electrically conductive material relative to the overall positive electrode mixture layer 34 can be, for example, approximately 2 to 20 mass %, and it is generally preferable for this proportion to be approximately 3 to 10 mass %. In cases where a binder is used, the proportion of the binder relative to the overall positive electrode mixture layer 34 can be, for example, approximately 0.5 to 10 mass %, and it is generally preferable for this proportion to be approximately 1 to 5 mass %.

<<Negative Electrode>>

An electrically conductive material consisting of a metal that exhibits good electrical conductivity (for example, copper, nickel, titanium or stainless steel) can be advantageously used as the negative electrode current collector 42. In the example shown in FIG. 6, a long sheet-shaped negative electrode current collector 42 is used.

Typically, the negative electrode mixture can be one obtained by preparing a paste-like or slurry-like composition having an appropriate viscosity (concentration) by dispersing, for example, a negative electrode active substance and negative electrode mixture layer constituent materials, which are used according to need, in an appropriate solvent. In addition, it is also possible to use a powdery mixture obtained by complexing a negative electrode active substance and negative electrode mixture layer constituent materials that are used according to need. One or two or more materials known to be able to be used as negative electrode active substances for non-aqueous electrolyte secondary batteries can be used without particular limitation as the negative electrode active substance. Preferred examples thereof include a variety of carbon materials, such as graphite, poorly graphitizable carbon (hard carbon), readily graphitizable carbon (soft carbon), and carbon nanotubes. Of these, graphite-based materials such as natural graphite and artificial graphite (and especially natural graphite) can be advantageously used due to exhibiting excellent electrical conductivity and high energy density.

The form of the negative electrode active substance is not particularly limited, but may be, for example, particulate or powdery. The average particle diameter of this type of particulate negative electrode active substance may be 25 µm or lower (typically 1 to 22 µm, for example 10 to 20 µm). In addition, the specific surface area of this type of particulate negative electrode active substance can be 1 $m^2/g$ or higher (typically 2.5 $m^2/g$ or higher, for example 2.8 $m^2/g$ or higher) and 10 m²/g or lower (typically 3.5 m²/g or lower, for example 3.4 m²/g or lower).

Moreover, in the present specification, "average particle diameter" means the particle diameter corresponding to a cumulative 50% from the small particle diameter side in a volume-based particle size distribution measured using particle size distribution measurements obtained using a conventional laser diffraction/light-scattering method (that is, the $D_{50}$ particle diameter or median diameter). In addition, in the present specification, "specific surface area (m²/g)" means a value determined by using a BET method (for example, a BET single point method) to analyze the quantity of gas adsorbed, which is measured using a gas adsorption method using nitrogen ($N_2$) gas as an adsorbate (a fixed volume type adsorption method).

In addition to the negative electrode active substance, the negative electrode mixture may, if necessary, contain one or two or more materials able to be used as constituent components of negative electrode mixture layers in ordinary non-aqueous electrolyte secondary batteries. Examples of such materials include binders and a variety of additives. For example, a polymer material such as a styrene-butadiene rubber (SBR), poly(vinylidene fluoride) (PVdF) or polytetrafluoroethylene (PTFE) can be advantageously used as the binder. In addition, a variety of additives, such as thickening agents, dispersing agents and electrically conductive materials, can be used as appropriate. For example, carboxymethyl cellulose (CMC) or methyl cellulose (MC) can be advantageously used as a thickening agent.

The solvent used to disperse the materials that constitute the paste-like positive electrode mixture can be any aqueous solvent or organic solvent that is suitable for the properties of the binder being used, and an example of a solvent able to be advantageously used is water (which may be ion exchanged water or the like).

The solid content concentration in the negative electrode mixture is not particularly limited, and can be adjusted to approximately 45 to 80 mass %. In the invention disclosed here, because powder fall-off from the negative electrode mixture layer 44 is reduced by the presence of the vibration-absorbing member 80, it is possible to prepare the negative electrode mixture by reducing the quantity of solvent compared to ordinary negative electrode mixtures, in other words, by increasing the solid content concentration. In the same way as with the positive electrode 30, this solid content concentration is typically 60 to 80 mass %, for example 70 to 75 mass %.

In addition, the proportion of the negative electrode active substance relative to the solid content in the negative electrode mixture should be approximately 50 mass % or higher, and it is generally preferable for this proportion to be 90 to 99 mass % (for example, 95 to 99 mass %). In cases where a binder is used, the proportion of the binder relative to the overall negative electrode mixture layer 44 can be, for example, approximately 1 to 10 mass %, and it is generally preferable for this proportion to be approximately 1 to 5 mass %. In cases where a thickening agent is used, the proportion of the thickening agent relative to the overall negative electrode mixture layer 44 can be, for example, approximately 1 to 10 mass %, and it is generally preferable for this proportion to be approximately 1 to 5 mass %.

<<Vibration-Absorbing Member>>

The vibration-absorbing member 80 is constituted mainly by the vibration-absorbing member 80, and can contain materials having a vibration-absorbing effect (hereinafter also referred to simply as "vibration-absorbing materials"). Typically, the vibration-absorbing member-forming composition can be one obtained by preparing a paste-like or slurry-like composition having an appropriate viscosity (concentration) by dispersing, for example, a vibration-absorbing material and constituent materials of the vibration-absorbing member 80, which are used according to need, in an appropriate solvent.

This vibration-absorbing material can be one or two or more materials which are not oxidized at the driving voltage of the electrode in which the vibration-absorbing member is disposed and which do not react when in contact with the non-aqueous electrolyte solution described later. This vibration-absorbing material can be any organic material, inorganic material, metal material, glass material, or the like, and is preferably a material that exhibits a high vibration-absorbing effect. For example, it is preferable for the vibration-absorbing material to be a resin or the like that is not oxidized at the driving voltage of the electrode. Typical examples of such resins include the resin materials mentioned above that are able to be ordinarily used as binders in positive electrodes and negative electrodes.

More specifically, in the case of a positive electrode, it is preferable for the vibration-absorbing material to be a material which does not impair the performance of the battery and which does not undergo an oxidation reaction at a voltage of 2.5 to 4.9 V (vs. Li). This type of material is not particularly limited, but examples thereof include polyolefin resins such as polypropylene (PP) and polyethylene (PE), and fluororesins such as tetrafluoroethylene-perfluoroalkoxyethylene copolymers (PFA), polytetrafluoroethylene (PTFE) and poly(vinylidene fluoride) (PVdF).

In addition, in the case of a negative electrode, it is preferable for the vibration-absorbing material to be a material which does not impair the performance of the battery and which does not undergo an oxidation or reduction reaction at a voltage of 0 to 3 V (vs. Li). This type of material is not particularly limited, but examples thereof include polyolefin resins such as polypropylene (PP) and polyethylene (PE), and rubbers such as styrene-butadiene rubbers (SBR).

Of these, polypropylene (PP) and polyethylene (PE), which can be used in both the positive electrode and the negative electrode, are more preferred. Polypropylene is particularly preferred from the perspectives of being lighter and being able to advantageously form a vibration-absorbing member-forming composition without the need for a binder.

In addition, it is preferable for the vibration-absorbing material to be particulate from the perspective of being able to advantageously form a vibration-absorbing member having a porous structure. The average particle diameter of this vibration-absorbing material is not particularly limited, but can be, for example, 1 to 20 µm. This average particle diameter is preferably 1 to 5 µm, for example 2 to 4 µm. By using particles having such an average particle diameter, a vibration-absorbing member having a porosity of greater than 0% but not greater than 40% can be conveniently produced.

Moreover, in addition to the materials that mainly constitute the vibration-absorbing member, the vibration-absorbing member-forming composition may, if necessary, contain one or two or more materials able to be used to prepare a mixture in an ordinary non-aqueous electrolyte secondary battery. Examples of such materials include binders and a variety of additives. A binder is not necessarily required, but a polymer material such as poly(vinylidene fluoride) can be advantageously used. In addition, a variety of additives, such as thickening agents, dispersing agents and electrically conductive materials, can be used as appropriate. For example, carboxymethyl cellulose (CMC) or methyl cellulose (MC) can be advantageously used as a thickening agent.

The solvent used to disperse the vibration-absorbing material or the like can be an aqueous solvent or an organic solvent, such as a lower alcohol, water, or a mixture thereof. In cases where the vibration-absorbing member-forming composition contains a binder, the solvent can be selected according to the properties of the binder being used, and in cases where a binder is not used, N-methyl-2-pyrrolidone can be advantageously used.

[2: Electrode Mixture Layer Formation Step]

As mentioned above, the positive electrode mixture layer 34 and negative electrode mixture layer 44 are formed by supplying the positive electrode mixture and negative electrode mixture to the positive electrode current collector 32 and negative electrode current collector 42 respectively. Here, it is possible to supply the positive and negative electrode mixtures while allowing the prescribed current collector parts 36 and 46 to remain unsupplied with electrode mixture in regions that include the edges 33 and 43 of the positive and negative current collectors 32 and 42. In the example shown in FIG. 6, band-like current collector parts 36 and 46 are provided at one edge, in the transverse direction that is perpendicular to the longitudinal direction, of the long sheet-shaped current collectors 32 and 42. The means for supplying the electrode mixtures is not particularly limited, and it is possible to use a suitable application device such as a gravure coater, a slit coater, a die coater, a comma coater or a dip coater. In addition, in the case of a paste-like electrode mixture, the solvent can also be removed using a conventional publicly known means (for example, drying by heating, vacuum drying, and the like).

The mass of positive electrode mixture layer 34 provided per unit area of positive electrode current collector 32 (that is, the mass per unit area) can be 3 mg/cm$^2$ or higher (for example, 5 mg/cm$^2$ or higher, and typically 10 mg/cm$^2$ or higher) on each side of the positive electrode current collector 32 from the perspective of ensuring satisfactory battery capacity. In addition, the mass of positive electrode mixture layer 34 provided on each side of the positive electrode current collector can be 50 mg/cm$^2$ or lower (for example, 40 mg/cm$^2$ or lower, and typically 20 mg/cm$^2$ or lower) from the perspective of ensuring input output characteristics. Moreover, in a constitution having the positive electrode mixture layer 34 on both sides of the positive electrode current collector 32, such as this embodiment, it is preferable for the mass of positive electrode mixture layer 34 to be approximately equal on each side of the positive electrode current collector 32.

In addition, the mass of negative electrode mixture layer 44 provided per unit area of negative electrode current collector 42 (that is, the mass per unit area) can be 3 mg/cm$^2$ or higher (typically 5 mg/cm$^2$ or higher, for example 7 mg/cm$^2$ or higher) on each side of the negative electrode current collector 42 from the perspective of ensuring satisfactory battery capacity. In addition, the mass of negative electrode mixture layer 44 provided on each side of the negative electrode current collector 42 can be 30 mg/cm$^2$ or lower (typically 20 mg/cm$^2$ or lower, for example 15 mg/cm$^2$ or lower) from the perspective of ensuring input output characteristics. Moreover, in a constitution having the negative electrode mixture layer 44 on both sides of the negative electrode current collector 42, such as this embodiment, it is preferable for the mass of negative electrode mixture layer 44 to be approximately equal on each side of the negative electrode current collector 42.

Moreover, the properties (that is, average thickness, density, porosity) of electrode mixture layers 34 and 44 such as those described above can be adjusted by, for example, forming the electrode mixture layers 34 and 44 and then subjecting the electrodes to a suitable pressing treatment. The pressing treatment can be a conventional publicly known pressing process, such as a roll pressing process or flat plate pressing process. In addition, this treatment can be carried out under heating. In addition, the number of pressing treatments can be one or two or more.

The average thickness of the positive electrode mixture layer 34 on each surface can be, for example, 40 μm or higher (and typically 50 μm or higher) and 100 μm or lower (and typically 80 μm or lower). In addition, the density of the positive electrode mixture layer 34 can be, for example, 1 to 4 g/cm$^3$ (for example, 1.5 to 3.5 g/cm$^3$). In addition, the porosity of the positive electrode mixture layer 34 can be, for example, 10 to 50 vol. % (typically 20 to 40 vol. %). If one or two or more of the properties mentioned above are satisfied, it is possible to ensure an appropriate quantity of voids in the positive electrode mixture layer 34 and ensure sufficient penetration of the non-aqueous electrolyte solution. As a result, a wide field of reaction with charge carriers can be ensured and even higher input output characteristics can be achieved. In addition, it is possible to maintain good electrical conductivity within the positive electrode mixture layer 34 and possible to suppress an increase in resistance. Furthermore, it is possible to ensure mechanical strength (shape retention properties) of the positive electrode mixture layer and achieve even better cycle characteristics.

In addition, the average thickness of the negative electrode mixture layer 44 on each surface can be, for example, 40 μm or higher (and preferably 50 μm or higher) and 100 μm or lower (and preferably 80 μm or lower). In addition, the density of the negative electrode mixture layer 44 can be, for example, 0.5 to 2 g/cm$^3$ (and preferably 1 to 1.5 g/cm$^3$). In addition, the porosity of the negative electrode mixture layer 44 can be, for example, 5 to 50 vol. % (and preferably 35 to 50 vol. %). If one or two or more of the properties mentioned above are satisfied, it is possible to achieve a higher energy density. In addition, it is possible to ensure an appropriate quantity of voids in the negative electrode mixture layer 44 and ensure sufficient penetration of the non-aqueous electrolyte solution. As a result, a wide field of reaction with charge carriers can be ensured and even higher input output characteristics can be achieved. Furthermore, it is possible to maintain a suitable interface with the non-aqueous electrolyte and achieve even higher durability (for example, cycle characteristics).

Moreover, in the present specification, "porosity" means a value obtained by dividing the total pore volume (cm$^3$), as determined using a mercury porosimeter, by the apparent volume (cm$^3$) of the mixture layer, and multiplying by 100. The apparent volume can be calculated by multiplying the area (cm$^2$), as seen from above, by the thickness (cm).

Furthermore, cases where the solid content concentration in the electrode mixture is a high concentration (typically 60 to 80 mass %, for example 70 to 75 mass %), as mentioned above, are not particularly limited, but the electrode mixture layer can be advantageously formed by, for example, using a method such as that disclosed in Patent Literature 2. In addition, the electrode mixture layer formation method in such cases can be a formation method involving a wet process or dry process, and a dry formation method such as a pressure molding method (which may be a rolling pressure molding method, a die pressure molding method, or the like) or an extrusion molding method (also known as paste extrusion) can be advantageously used. By using a dry formation method, it is possible to greatly reduce the quantity of solvent used (and preferable not to use a solvent at all) and it is possible to reduce production costs by not requiring a drying step.

[3: Vibration-Absorbing Member and Electrode Formation Step]

Next, the electrodes 30 and 40 are prepared by forming the vibration-absorbing member 80 by supplying the vibration-absorbing member-forming composition to a part of the current collector parts 36 and 46 of the electrode current collectors 32 and 42. At this point, the vibration-absorbing member-forming composition is supplied to a part of a region between the weld section 64 or 74 and the electrode mixture layer while allowing at least the weld sections 64 and 74, which are connected to the current collector terminals 62 and 72 in a subsequent step, to remain unsupplied with the composition. In this way, it is possible to form the vibration-absorbing member 80 on only a part of the region between the weld section 64 or 74 and the electrode mixture layer 34 or 44, rather than the whole of this region.

In the example shown in FIG. 6, a band-like vibration-absorbing member 80 is formed continuously in a direction along the boundaries between the positive and negative electrode mixture layers 34 and 44 and the positive and negative current collector parts 36 and 46 in such a way that the vibration-absorbing member is in contact with the positive and negative electrode mixture layers 34 and 44. In cases where the electrodes 30 and 40 are formed towards the flat wound electrode body 20, if the longitudinal direction of the electrodes 30 and 40 as seen from above (that is, as seen from the direction in which the electrodes are flatly squashed in a subsequent step) is the transverse direction of the wound electrode body 20, the vibration-absorbing member 80 is formed so as to have a length that is at least the length of the weld sections 64 and 74 in this transverse direction but shorter than the width of the wound electrode body 20. This type of vibration-absorbing member 80 can be achieved by, for example, using an intermittent coating method to coat the vibration-absorbing member-forming composition intermittently in the longitudinal direction of the electrodes 30 and 40.

Conventional publicly known methods similar to those used for the electrode mixture layers can be used as methods for coating and drying the vibration-absorbing member-forming composition. In addition, the properties (porosity, thickness, density) of the vibration-absorbing member 80 can be adjusted by adjusting the solid content concentration or supplied quantity of the vibration-absorbing member-forming composition or by carrying out an appropriate pressing treatment in the same way as for the electrode mixture layers 34 and 44 mentioned above.

Moreover, in cases where the vibration-absorbing member is formed using a vibration-absorbing member-forming composition prepared without using a binder, a vibration-absorbing member having a porous structure can be advantageously formed by, for example, applying heat rays or hot air when drying the coated composition so as to bind the vibration-absorbing materials (typically resin particles such as polypropylene particles) to each other by means of fusion bonding.

[4: Electrode Body Construction Step]

The electrode body 20, which is provided with at least the electrodes 30 and 40 prepared in this way, is constructed. The constitution of the electrode body 20 is not particularly limited, and a form in which the positive electrode 30 and the negative electrode 40 are insulated from each other by means of a separator 50 can generally be considered. Specifically, it is possible to use a constitution in which the positive electrode mixture layer 34 and the negative electrode mixture layer 44 are disposed so as to face each other, with the separator 50 disposed therebetween. In such cases, a single power-generating component consisting of positive electrode mixture layer 34—separator 50—negative electrode mixture layer 44 may be included in a single battery 100, but it is also possible for two or more such power-generating components to be included in a single battery.

The wound electrode body 20 shown in FIG. 6 can be constructed by, for example, overlaying a long sheet-shaped positive electrode (positive electrode sheet) 30, a separator (separator sheet) 50, a long sheet-shaped negative electrode (negative electrode sheet) 40 and a separator (separator sheet) 50 in that order from above so as to form a layered body, winding this layered body in the longitudinal direction, and then squeezing the obtained wound body from a direction that is perpendicular to the winding axis, thereby forming a flat shape. Here, the positive electrode sheet 30 and the negative electrode sheet 40 are layered so as to be offset in the transverse direction, so that the current collector part 36 of the positive electrode sheet 30 protrudes from an edge on one side (the left-hand side in the diagram) of the wound electrode body 20 and the current collector part 46 of the negative electrode sheet 40 protrudes from an edge on the other side (the right-hand side in the diagram) of the wound electrode body 20. In addition, the negative electrode mixture layer 44 is formed so as to have a slightly greater width than the positive electrode mixture layer 34, so that the negative electrode mixture layer 44 covers the positive electrode mixture layer 34 in the transverse direction. In addition, the separator sheet 50 is formed so as to have a slightly greater width than the negative electrode mixture layer 44 and the positive electrode mixture layer 34 in the transverse direction so that the negative electrode mixture layer 44 and the positive electrode mixture layer 34 are reliably insulated from each other. In addition, the direction in which the wound electrode body 20 is squeezed is set so that the vibration-absorbing member 80 is disposed roughly in the center in the transverse direction when the wound electrode body 20 is seen from above.

Moreover, the electrode body 20 can be, for example, a layered electrode body 20 obtained by layering a plurality of power-generating components consisting of positive electrode mixture layer 34—separator 50—negative electrode mixture layer 44, with separators 50 disposed therebetween. A layered electrode body 20 can be constructed by preparing a plurality of positive electrodes 30 and negative electrodes 40 as the electrodes 30 and 40 and then, for example, layering a prescribed number of combinations consisting of a sheet-shaped positive electrode 30, a separator 50, a sheet-shaped negative electrode 40 and a separator 50, as seen from above (see FIG. 5 (b)). In the case of a layered electrode body 20, the vibration-absorbing member 80 can be disposed in at least some of the electrodes 30 and 40. It is preferable for the vibration-absorbing member 80 to be provided in all of the positive electrodes 30 and negative electrodes 40. In addition, it is preferable for the vibration-absorbing members 80 to be disposed approximately in the center of the electrodes 30 and 40 in the transverse direction.

The separator (separator sheet) 50 insulates the positive electrode mixture layer 34 from the negative electrode mixture layer 44, should have a microporous structure that allows the movement of charge carriers (lithium ions in this case) between the positive electrode mixture layer 34 and the negative electrode mixture layer 44 (which may be a non-aqueous electrolyte solution holding function), and preferably exhibits a shutdown function. Preferred examples of the separator 50 include porous resin sheets (films) comprising resins such as polyethylene (PE), polypropylene (PP), polyesters, cellulose and polyamides. This type of porous resin sheet may have a single layer structure or a laminated structure having two or more layers (for example, a three layer structure obtained by laminating a PP layer on both surfaces of a PE layer). The average thickness of the porous resin sheet can be, for example, approximately 10 to 40 µm. In addition, the separator 50 may have a constitution in which a porous heat-resistant layer is provided on one surface or both surfaces (typically one surface) of the porous resin sheet. This porous heat-resistant layer may be, for example, a layer that contains an inorganic material (preferably an inorganic filler such as alumina particles) and a binder. Alternatively, this type of porous heat-resistant layer may be a layer that contains insulating resin particles (for example particles of polyethylene, polypropylene, or the like).

[5: Current Collector Terminal Welding Step]

Next, the current collector terminals 62 and 72 are joined by means of welding to the weld sections 64 and 74, which were allowed to remain unsupplied with the composition in the current collector parts 36 and 46, in the electrode body 20.

As shown in FIG. 5 (a), the current collector terminals 62 and 72 are joined to at least either of the positive electrode 30 and negative electrode 40 (both electrodes in the diagram) in the wound electrode body 20. For example, when carrying out the joining, the current collector parts 36 and 46 of the electrodes 30 and 40, which protrude in a wound state, are tightly bonded to each other by compacting in a direction that is perpendicular to the winding axis, and the current collector terminals 62 and 72 are brought into contact with the outermost weld sections 64 and 74 of the current collector parts 36 and 46 (which may be current collector part groups) in the thus integrated electrodes 30 and 40. In this state, the current collector parts 36 and 46 can be integrally joined by means of welding to the current collector terminals 62 and 72 at the weld sections 64 and 74.

As shown in FIG. 5 (b), the current collector terminals 62 and 72 are joined to at least either of the plurality of positive electrodes 30 and plurality of negative electrodes 40 (only the positive electrodes 30 in the diagram) in the layered electrode body 20. For example, when carrying out the joining, the weld sections 64 and 74 of the current collector parts 36 and 46 are tightly bonded to each other by compacting in the layering direction of the electrodes 30 and 40, and the current collector terminals 62 and 72 are brought into contact with the outermost weld sections 64 and 74 of the thus compacted current collector parts 36 and 46. In this state, the plurality of current collector parts 36 and 46 can be integrally joined by means of welding to the current collector terminals at the weld sections 64 and 74.

In this way, the current collector parts 36 and 46 are constituted so as to include weld sections 64 and 74 that are welded to current collector parts 36 and 46 of other electrode current collectors 32 and 42 that are adjacent in the layering direction. In addition, the current collector parts 36 and 46 are provided with the vibration-absorbing member 80 between the weld sections 64 and 74 and the electrode mixture layers 34 and 44.

Figure 3:
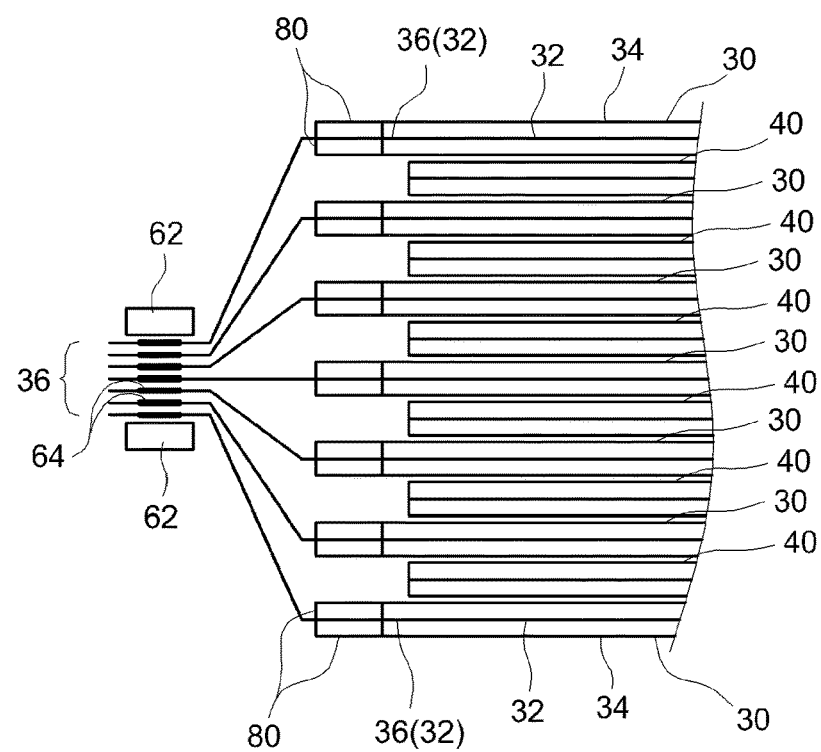
FIG. 3 is a cross-sectional schematic diagram that illustrates the manner in which a current collector terminal is joined to a current collector part in an electrode body according to one embodiment.

FIG. 3 schematically illustrates a cross-section that includes weld sections to which the current collector terminals 62 and 72 are joined in the wound electrode body 20 or layered electrode body 20. Moreover, the separators 50 are not shown in order to simplify the diagram. In cases where the current collector terminals 62 and 72 are joined by means of welding at locations where the electrodes 30 and 40 are multilayered, as in the wound or layered electrode body 20, transmission of shocks and vibrations from the weld sections 64 and 74 to the electrode mixture layers 34 and 44 during welding can be reliably suppressed by providing a vibration-absorbing member 80 for each weld section 64 and 74. Furthermore, even in the unlikely event that powder fall-off from the mixture layers 34 and 44 occurs or the mixture layers 34 and 44 become detached or loosened, detached mixture layer 34 or 44 can be advantageously retained between the electrode current collectors 32 and 42 due to the presence of the vibration-absorbing member 80.

The current collector terminal 62 and 72 are not particularly limited in terms of material, shape, and the like as long as the internal resistance of the battery is not increased more than necessary, and a variety of modes can be considered according to the shape of the battery 100, the constitution of the electrode body 20, and the like. In addition, the positive electrode current collector terminal can be aluminum or an aluminum alloy, and the negative electrode current collector terminal can be copper, nickel, or the like. FIG. 1 shows an example of current collector terminals 62 and 72, which are fixed to the inner side of the lid of the battery case 10, electrically connected to an external positive electrode terminal 60 and external negative electrode terminal 70 respectively, and are welded to the positive electrode current collector part 36 and negative electrode current collector part 46 respectively in the electrode body 20. Moreover, FIG. 5 and FIG. 3 show only the tips of the current collector terminals 62 and 72, which are those parts that are connected to the positive electrode current collector part 36 and negative electrode current collector part 46.

Here, the welding method is not particularly limited, and a variety of welding methods can be used. For example, a welding method such as resistance welding or ultrasonic welding can be used. Because the materials that constitute the electrode current collectors 32 and 42 are often relatively thin and exhibit high thermal conductivity, ultrasonic welding can be more preferred from perspectives such as having less thermal impact on materials being welded due to using lower welding temperatures than resistance welding and the like, and being able to weld thin materials such as foils. Because ultrasonic welding causes greater vibration during welding than resistance welding methods, the transmission of vibrations to the materials being welded can be a problem, but because the vibration-absorbing member 80 is formed in a part of a region between the weld sections 64 and 74 and the electrode mixture layers 34 and 44 in the production method of the present invention, these vibrations can be effectively absorbed. When welding electrode current collectors having relatively brittle electrode mixture layers in particular, welding by means of ultrasonic welding can be advantageously carried out because problems such as powder fall-off from the electrode mixture layers and loosening or detachment of the electrode mixture layers can be reduced. Therefore, the technique disclosed here can be advantageously used for a secondary battery having relatively brittle electrode mixture layers that are produced using, for example, pastes having a high solid content proportion (for example, 75 mass % or more in the positive electrode and 70 mass % or more in the negative electrode).

Moreover, the ultrasonic welding conditions can be adjusted as appropriate according to the constitution of the non-aqueous electrolyte secondary battery in question. For example, the pressure is typically 50 to 30 kgf/cm$^2$, and preferably 100 to 200 kgf/cm², the amplitude is typically 5 to 90 μm, and preferably 10 to 70 μm, the frequency is typically 10 to 30 kHz, and preferably 10 to 30 kHz, the welding time is typically 0.1 to 0.5 seconds, and preferably 0.15 to 0.25 seconds. In addition, by welding the current collector terminals 62 and 72, power can be extracted highly efficiently from the electrode body via the current collector terminals.

[6: Battery Construction Step]

The non-aqueous electrolyte secondary battery 100 provided with the electrode body 20, which is prepared in the manner described above, is typically constructed by housing the electrode body 20 in the battery case 10.

In the example shown in FIG. 1, the battery case 10 is provided with a flat rectangular (box-shaped) battery case main body 12, the top of which is open, and a lid 14 that seals this open part. The positive electrode terminal 60 and negative electrode terminal 70, which are for external connection, are provided on the upper surface (that is, the lid 14) of the battery case 10 so as to be insulated from the lid 14. In the same way as battery cases of conventional non-aqueous electrolyte secondary batteries, the lid 14 is provided with a safety valve (not shown), which is used to discharge gas generated inside the battery case 10 to outside the battery case 10, and an injection port (not shown) that is used to inject the electrolyte solution.

The material of the battery case 10 can be a metal material such as aluminum or steel, or a resin material such as a poly(phenylene sulfide) resin or polyimide resin. Of these, a relatively lightweight metal (for example, aluminum or an aluminum alloy) is preferred from the perspectives of improving heat dissipation properties and increasing energy density. In addition, the shape of the case (the external shape of the container) is rectangular in this case, but may also be round (cylindrical, coin-shaped or button-shaped), hexahedral (cuboid or cubic), bag-shaped or a deformed shape obtained by processing these shapes.

In the electrode body 20, the positive and negative current collector terminals 62 and 72, which are connected in the manner described above, can be connected by means of resistance welding or the like to the external positive electrode terminal 60 and the external negative electrode terminal 70 respectively, which are provided in the lid 14. Here, a safety device that discharges gas, which is generated inside the battery case 10 when the pressure inside the battery case 10 rises, to outside the battery case may be provided between the positive or negative current collector 32 or 42 and the external positive or negative electrode terminal 60 or 70. In this way, the electrode body 20, which is integrated with the lid 14 of the battery case 10, is housed in the battery case 10, and the lid 14 and the battery case main body 12 are tightly sealed by means of welding or the like. Next, the non-aqueous electrolyte secondary battery 100 can be constructed by allowing the non-aqueous electrolyte solution to penetrate inside the electrode body 20 by injecting the non-aqueous electrolyte solution into the battery case 10 through the electrolyte solution injection port (not shown).

The non-aqueous electrolyte contains at least a supporting electrolyte in a non-aqueous solvent. The non-aqueous electrolyte solution is a liquid at ordinary temperature (for example, 25° C.) and, in a preferred aspect, is always a liquid in the environment in which the battery is used (for example, in an environment having a temperature of between −30° C. and 60° C.).

The non-aqueous solvent can be organic solvents able to be used in electrolytes of ordinary non-aqueous electrolyte secondary batteries 100, such as carbonates, ethers, esters, nitriles, sulfones or lactones. Specific examples thereof include ethylene carbonate (EC), propylene carbonate (PC), diethyl carbonate (DEC), dimethyl carbonate (DMC), ethyl methyl carbonate (EMC). This type of non-aqueous solvent can be a single type or an appropriate combination of two or more types thereof. In a preferred aspect, a mixture of a solvent having a high dielectric constant and a solvent having a low viscosity is used. By using this type of mixed solvent, high electrical conductivity can be achieved and the electrolyte can be used across a broad temperature range. An example of a solvent having a high dielectric constant is EC, and examples of solvents having low viscosities are DMC and EMC. For example, a non-aqueous solvent which contains one or two or more types of carbonate and in which the total volume of these carbonates accounts for 60 vol. % (more preferably 75 vol. % or higher, further preferably 90 vol. % or higher, and substantially 100 vol. %) of the overall volume of the non-aqueous solvent can be advantageously used as the non-aqueous solvent. In another preferred aspect, ethylene carbonate accounts for 20 to 40 vol. % of the overall volume of the non-aqueous solvent.

It is possible to appropriately select a supporting electrolyte similar to those used in ordinary non-aqueous electrolyte secondary batteries as the supporting electrolyte as long as the supporting electrolyte contains a charge carrier (for example, lithium ions, sodium ions, magnesium ions, and the like. Lithium ions in the case of a lithium ion secondary battery). For example, in cases where the charge carriers are lithium ions, lithium salts such as $LiPF_6$, $LiBF_4$, $LiClO_4$, $LiAsF_6$, $Li(CF_3SO_2)_2N$ and $LiCF_3SO_3$ can be given as examples of the supporting electrolyte. This type of supporting electrolyte may be a single supporting electrolyte or a combination of two or more types thereof. A particularly preferred example of the supporting electrolyte is $LiPF_6$. In addition, it is preferable for the non-aqueous electrolyte solution to be prepared in such a way that the concentration of the supporting electrolyte falls within the range 0.7 to 1.3 mol/L.

The battery 100 disclosed here can be used in a variety of applications, but the effect of reducing shocks and vibrations during welding is advantageously exhibited by the vibration-absorbing member 80, and separation of constituent materials of the electrode mixture layers 34 and 44 and loosening or detachment of the electrode mixture layers 34 and 44 can be largely suppressed. In addition, even if separation of constituent materials of the electrode mixture layers 34 and 44 or loosening or detachment of the electrode mixture layers 34 and 44 does occur, discharge of such material into the electrode solution can be suppressed by the presence of the vibration-absorbing member 80, and high rate charging and discharging, for example, can be advantageously exhibited over a long period of time. By utilizing properties such as these, the battery 100 can be advantageously used in, for example, a power source fitted to a vehicle. The type of vehicle is not particularly limited, but examples thereof include plug-in hybrid vehicles (PHV), hybrid vehicles (HV), electric vehicles (EV), electric trucks, motorized bicycles, electrically assisted bicycles, electrically powered wheelchairs and electric trains. In this way, the present invention can provide a vehicle advantageously fitted with any of the non-aqueous electrolyte secondary batteries disclosed here as a motive power source. The non-aqueous electrolyte secondary battery used in the vehicle can generally be in the form of the battery pack mentioned above, in which a plurality of single batteries are connected.

Several working examples relating to the present invention will now be explained, but the present invention is in no way limited to these specific examples.

A non-aqueous electrolyte secondary battery provided with a wound electrode body was produced using the following procedure.

First, a paste-like positive electrode mixture was prepared by placing $LiNi_{1/3}Mn_{1/3}Co_{1/3}O_2$ (LNCM) as a positive electrode active substance, acetylene black (AB) as an electrically conductive material and poly(vinylidene fluoride) (PVdF) as a binder in a mixer at a LNCM:AB:PVdF mass ratio of 90:6:4, and then kneading while adjusting the viscosity by means of N-methylpyrrolidone (NMP). A positive electrode sheet having a positive electrode mixture layer on both sides of a positive electrode current collector (thickness per side: 72 μm, mixture layer density: 2.7 g/cm$^3$) was prepared by coating this positive electrode mixture on both sides of a long aluminum foil (a positive electrode current collector) having a thickness of 15 μm, drying the mixture, and then pressing. Moreover, a positive electrode sheet having a current collector part on one edge in the longitudinal direction was obtained by supplying the positive electrode mixture to approximately the central part of a long aluminum foil while leaving band-like current collector parts having widths of 20 mm along both edges in the transverse direction of the foil unsupplied with the positive electrode mixture, thereby forming the positive electrode mixture layer, and then forming slits in the center of the positive electrode mixture layer in the longitudinal direction in a subsequent step.

In addition, in the present working example, the positive electrode mixture was prepared so that the positive electrode active substance had an oil absorption amount of 33 [ml/100 g] and the positive electrode mixture had a solid content proportion of 80%. The oil absorption amount was a value obtained using linseed oil and measured in accordance with JIS K5101-13-2. Here, it is known that the threshold value for the solid content proportion in the electrode mixture at which powder fall-off occurs varies according to the oil absorption amount of the electrode active substance. According to investigations by the inventors of the present invention, it was found that powder fall-off occurred to a significant extent in cases where the positive electrode mixture layer was formed using a positive electrode active substance having the oil absorption amount mentioned above and in cases where the positive electrode mixture layer was formed from a mixture having a solid content proportion of 75% or more. These positive electrode mixtures were prepared in such a way that powder fall-off from the mixture layer readily occurred.

Next, a slurry-like negative electrode mixture was prepared by placing natural graphite (C) as a negative electrode active substance, a styrene-butadiene rubber (SBR) as a binder and carboxymethyl cellulose (CMC) as a thickening agent in a kneader at a C:SBR:CMC mass ratio of 98:1:1 and kneading while adjusting the viscosity by means of ion exchanged water. A negative electrode sheet having a negative electrode mixture layer on both sides of a negative electrode current collector (thickness per side: 60 μm, mixture layer density: 1.4 g/cm$^3$) was prepared by coating this negative electrode mixture on both sides of a long copper foil (a negative electrode current collector) having a thickness of 10 μm, drying the mixture, and then pressing. Moreover, a negative electrode sheet having a current collector part on one edge in the longitudinal direction was obtained by supplying the negative electrode mixture to approximately the central part of a long copper foil while leaving band-like current collector parts having widths of 20 mm along both edges in the transverse direction of the foil unsupplied with the negative electrode mixture, thereby forming the negative electrode mixture layer, and then forming slits in the center of the negative electrode mixture layer in the longitudinal direction in a subsequent step.

In addition, in the present working example, the negative electrode mixture was prepared so that the negative electrode active substance had an oil absorption amount of 50 [ml/100 g] and the negative electrode mixture had a solid content proportion of 70%. The oil absorption amount was an oil absorption (or a water absorption) amount obtained using water and measured in accordance with JIS K5101-13-2. According to investigations by the inventors of the present invention, it was found that powder fall-off occurred to a significant extent in cases where the negative electrode mixture layer was formed using a negative electrode active substance having the water absorption amount mentioned above and in cases where the negative electrode mixture layer was formed from a mixture having a solid content proportion of 70% or more, in the same way as the positive electrode. These negative electrode mixtures were prepared in such a way that powder fall-off from the mixture layer readily occurred.

Meanwhile, a vibration-absorbing member-forming composition was prepared by preparing polypropylene (PP) particles having diameters of 3 μm as the vibration-absorbing member and dispersing these polypropylene particles in N-methylpyrrolidone (NMP) as a dispersion medium so as to have a solid content proportion of 40%.

A vibration-absorbing member was formed by using an intermittent coating method to supply the vibration-absorbing member-forming composition intermittently in the form of a band having a width of 5 mm so that the vibration-absorbing member would be in contact with the positive electrode sheet mixture layer and negative electrode sheet mixture layer after pressing, and then drying the composition. The porosity of the vibration-absorbing member formed in this way was 35%. Moreover, the coating interval in the intermittent coating was set to be a dimension that was at least the width of the current collector terminals mentioned below and shorter than the width of the electrode body. For example, this dimension can be calculated on the basis of the electrode width (that is, the size corresponding to the longitudinal direction of the sheet when the flat wound electrode body is viewed from above) in the flat wound electrode body, which is calculated on the basis of the width of the current collector terminal and the diameter of the winding axis of the wound electrode body or the thicknesses of the positive electrode sheet, the negative electrode sheet and the separator described below.

Moreover, the thickness of the vibration-absorbing member was adjusted so as to be between 0% (that is, a case in which the vibration-absorbing member is not formed) and 150% of the thickness of the positive electrode mixture layer or negative electrode mixture layer, and 13 varieties of positive and negative electrode sheets were prepared.

In addition, for purposes of comparison, an electrode sheet in which the vibration-absorbing member was provided on almost the entire current collector part region apart from the current collector terminal weld sections described below was prepared as an electrode sheet in which the thickness of the vibration-absorbing member was 60% of the thickness of the electrode mixture.

A flat wound electrode body was prepared by laminating the thus prepared positive electrode sheet and negative electrode sheet in a mutually insulated state, with 2 separator sheets (here, each separator sheet was a three-layer structure obtained by a laminating polypropylene (PP) layer on both surfaces of a polyethylene (PE) layer, and had a thickness of 20 μm) interposed therebetween, winding the layered body, and then squeezing the wound body in a direction perpendicular to the winding axis. Here, the positive electrode sheet and the negative electrode sheet were layered in an offset manner so that the current collector part of the positive electrode sheet and the current collector part of the negative electrode sheet protruded from different sides in the transverse direction, as shown in FIG. 6. In addition, the wound electrode body was squeezed so that the vibration-absorbing member was disposed in the center of the wound electrode body in the transverse direction after the electrode body was flattened.

[Evaluation of Degree of Powder Fall-Off]

Next, the weld section provided in the vicinity of the end at the center of the current collector part that protrudes from both ends of the wound electrode body was integrally welded by means of ultrasonic welding while the weld section was sandwiched by the current collector terminals, as shown in FIG. 5 (a), and the degree of powder fall-off from the mixture layer was investigated. The current collector terminals were joined so that the vibration-absorbing member was disposed across the region in which the weld section faces the electrode mixture layer in a direction along the boundary between the electrode mixture layer and the current collector part. The degree of powder fall-off from the positive electrode or negative electrode was determined by measuring the weight of the positive electrode or negative electrode current collector terminal before and after welding. Moreover, scattered powder was removed by brushing and air blowing to a degree whereby mixture slip did not occur. These results are shown in FIG. 7.

Moreover, the ultrasonic welding conditions were as follows: pressure: 130 Pa, amplitude 50 μm, frequency: 20 kHz, welding time: 0.25 seconds. An aluminum current collector terminal was used for the positive electrode current collector part, and a nickel current collector terminal was used for the negative electrode current collector part. In addition, by welding the current collector terminals, power can be extracted highly efficiently from the electrode body via the current collector terminals. In FIG. 5 (a), only a part of the current collector terminal is shown, and the current collector terminal is formed into a shape that can be connected to the external terminal on the battery case.

Figure 7:
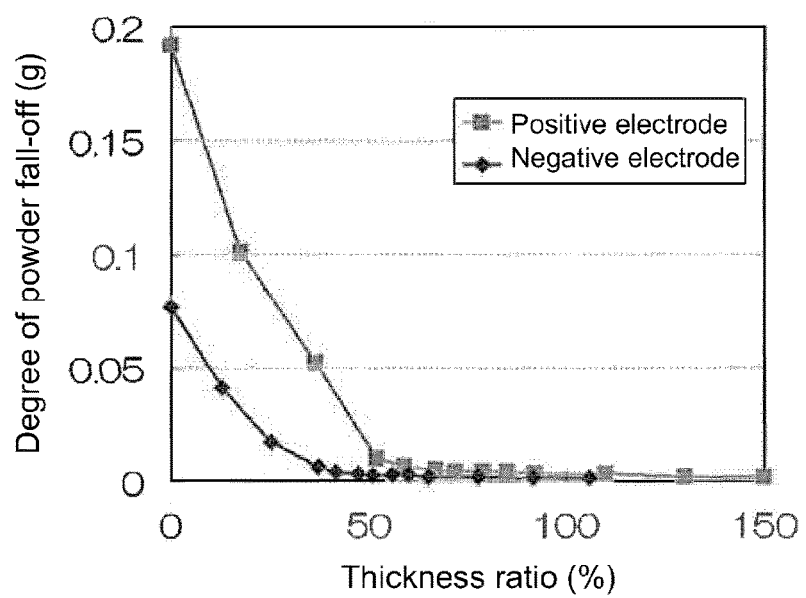
FIG. 7 is a graph that shows the relationship between the thickness of a vibration-absorbing member and the degree of powder fall-off caused by welding in a working example.

It can be confirmed from FIG. 7 that by increasing the thickness of the vibration-absorbing member, it is possible to reduce the degree of powder fall-off from the mixture layer. It was understood that the degree of powder fall-off from the positive electrode mixture layer could be reduced by approximately 80% by setting the thickness of the vibration-absorbing member to be approximately 45% or more of the thickness of the positive electrode mixture layer, and that the degree of powder fall-off from the positive electrode mixture layer could be greatly reduced by approximately 90% or more by setting the thickness of the vibration-absorbing member to be approximately 50% or more of the thickness of the positive electrode mixture layer. In addition, it was understood that the degree of powder fall-off from the negative electrode mixture layer could be reduced by approximately 90% by setting the thickness of the vibration-absorbing member to be approximately 25% or more of the thickness of the negative electrode mixture layer, and that the degree of powder fall-off from the negative electrode mixture layer could be greatly reduced by approximately 95% or more by setting the thickness of the vibration-absorbing member to be approximately 45% or more of the thickness of the negative electrode mixture layer. For example, it is thought that by setting the thickness of the vibration-absorbing member to be approximately 45% or more of the thickness of the electrode mixture layer, powder fall-off from the mixture layer during ultrasonic welding can be sufficiently suppressed.

Moreover, in the present example, it is thought that the reason why the degree of powder fall-off from the positive electrode is approximately twice the degree of powder fall-off from the negative electrode is because the weight of mixture per unit area of the positive electrode was approximately twice the weight of mixture per unit area of the negative electrode.

Next, the positive electrode terminal and negative electrode terminal were attached to the lid of the battery case, and these terminals were welded to the current collector terminals, to which the positive electrode sheet and negative electrode sheet of the wound electrode body were welded. The wound electrode body, to which the lid was connected in this way, was placed in the square battery case via the opening, and the opening was welded to the lid. Next, the non-aqueous electrolyte solution was injected into the battery case through the electrolyte solution injection port provided in the lid, and the non-aqueous electrolyte solution was allowed to penetrate into the wound electrode body. The non-aqueous electrolyte solution was obtained by dissolving $LiPF_6$ as a supporting electrolyte at a concentration of 1.0 mol/L in a mixed solvent containing ethylene carbonate (EC), ethyl methyl carbonate (EMC) and dimethyl carbonate (DMC) at an EC:EMC:DMC volume ratio of 30:40:30. A lithium ion secondary battery was constructed in this way.

[Evaluation of Electrolyte Solution Penetration]

Moreover, whether the resistance between the positive and negative electrode terminals did or did not change when the electrolyte solution was injected was investigated using lithium ion secondary batteries constructed so that the thickness of the vibration-absorbing member was 0% (conventional example) and 60% (working example) of the thickness of the positive electrode sheet and negative electrode sheet. For purposes of comparison, a similar evaluation was carried out for a lithium ion secondary battery in which the vibration-absorbing member had a thickness corresponding to 60% of the thickness of the electrode sheet and was provided on almost the entire region of the current collector part (comparative example). These results are shown in FIG. 8.

Figure 8:
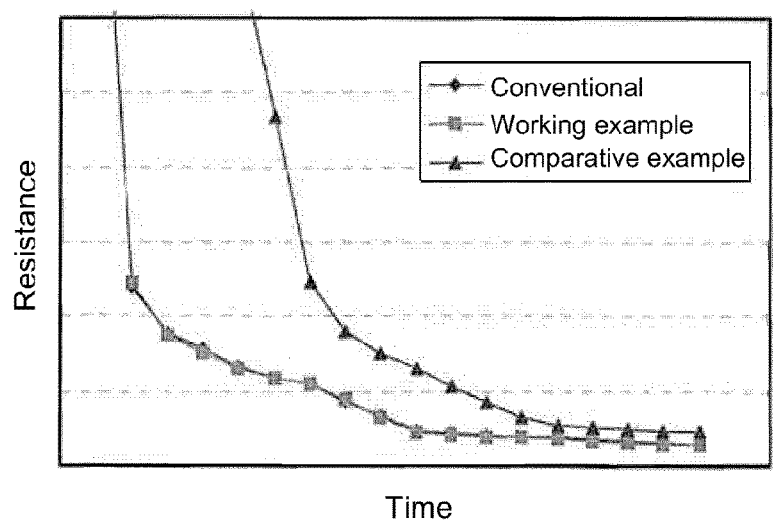
FIG. 8 is a graph that shows the relationship between the manner in which a vibration-absorbing member is disposed in an electrode and the resistance behavior during electrolyte solution impregnation in a working example.

The lithium ion secondary battery of the present invention, in which the vibration-absorbing member was provided in the current collector parts of the electrodes, exhibited almost the same change in resistance as a conventional lithium ion secondary battery not having a vibration-absorbing member, as shown in FIG. 8, and it was confirmed that providing the vibration-absorbing member did not impair penetration of the electrolyte solution in any way. Meanwhile, it was understood that the lithium ion secondary battery of the comparative example, which was constructed so that the thickness of the vibration-absorbing member was 60% but the vibration-absorbing member was provided on almost the entire region of the current collector part, exhibited a gradual decrease in resistance and required a long period of time for the electrolyte solution to fully penetrate due to the vibration-absorbing member impairing penetration of the electrolyte solution. This confirms that providing the vibration-absorbing member on almost the entire region of the current collector part leads to an increase in the time required for the electrolyte solution penetration step, which is not desirable.

Therefore, by appropriately providing the vibration-absorbing member in a part of the region between the electrode mixture layer and the current collector terminal, it is possible to prevent separation of constituent materials from the electrode mixture layer (powder fall-off) without impairing penetration of the electrolyte solution and also possible to achieve a non-aqueous electrolyte secondary battery having a high quality electrode mixture layer.

The present invention has been explained in detail above, but the embodiments and working examples given above are merely indicative, and the invention disclosed here encompasses modes obtained by variously modifying or altering the specific examples shown above.

REFERENCE SIGNS LIST

10: Battery case
12: Battery case main body
14: Lid
20: Electrode body
30: Positive electrode (positive electrode sheet)
32: Positive electrode current collector
34: Positive electrode mixture layer
36: Positive electrode current collector part
40: Negative electrode (negative electrode sheet)
42: Negative electrode current collector
44: Negative electrode mixture layer
46: Negative electrode current collector part
50: Separator sheet (separator)
60: External positive electrode terminal
62: Positive electrode current collector terminal
64: Weld section
70: External negative electrode terminal
72: Negative electrode current collector terminal
74: Weld section
100: Non-aqueous electrolyte secondary battery

The invention claimed is:

1. A non-aqueous electrolyte secondary battery comprising:
power-generating components including an electrode, and being layered to construct a layered structure;
the electrode comprising:
an electrode current collector having a current collector part, the current collector part including a weld section that is welded to the current collector part of another electrode current collector that is adjacent in a layering direction;
an electrode mixture layer provided in a part of the electrode current collector excluding the current collector part; and
a vibration-absorbing member provided in a part of the current collector part and between the weld section and the electrode mixture layer,
wherein the vibration-absorbing member has a porous structure constituted from resin particles that are not oxidized at a voltage of driving the electrode.

2. The non-aqueous electrolyte secondary battery according to claim 1, wherein the vibration-absorbing member is formed in such a way that the length of the vibration-absorbing member in a direction along the boundary between the electrode mixture layer and the current collector part is
equal to or greater than the length of the weld section in this direction and
shorter than the length of the electrode current collector in this direction.

3. The non-aqueous electrolyte secondary battery according to claim 2, wherein the vibration-absorbing member is formed in a band-like manner in the direction along the boundary so as to be in contact with the electrode mixture layer.

4. The non-aqueous electrolyte secondary battery according to claim 1, wherein
the electrode includes a positive electrode in which a positive electrode mixture layer is formed on a surface of a positive electrode current collector, and
the thickness of the vibration-absorbing member provided in the positive electrode is at least 50% of the thickness of the positive electrode mixture layer.

5. The non-aqueous electrolyte secondary battery according to claim 1, wherein
the electrode includes a negative electrode in which a negative electrode mixture layer is formed on a surface of a negative electrode current collector, and
the thickness of the vibration-absorbing member provided in the negative electrode is equal to or more than 45% of the thickness of the negative electrode mixture layer.

6. The non-aqueous electrolyte secondary battery according to claim 1 wherein the vibration-absorbing member has a porosity of 60% or lower.

7. A method for producing the non-aqueous electrolyte secondary battery according to claim 1, the method comprising:
preparing the electrode current collector, an electrode mixture for forming the electrode mixture layer, and a vibration-absorbing member-forming composition for forming the vibration-absorbing member;
supplying the electrode mixture to the electrode current collector while allowing the current collector part to remain unsupplied with electrode mixture to form the electrode mixture layer;
forming the vibration-absorbing member on the current collector part of the electrode current collector by supplying the vibration-absorbing member-forming composition to a part of a region between the weld section and the electrode mixture layer while allowing at least the weld section to remain unsupplied with the composition to prepare the electrode;
constructing a layered structure by layering a plurality of power-generating components that include the electrode;
welding, at the weld section, the current collector part of the layered structure to the current collector part of another electrode current collector that is adjacent in a layering direction;
welding a current collector terminal to the weld section, which was allowed to remain unsupplied with the composition; in the current collector part;
and constructing a non-aqueous electrolyte secondary battery provided with the layered structure.

8. The method according to claim 7, wherein the welding is ultrasonic welding.

9. The non-aqueous electrolyte secondary battery according to claim 1, wherein the vibration-absorbing member has a porosity of from 20 to 60%.

10. The non-aqueous electrolyte secondary battery according to claim 1, wherein the vibration-absorbing member has a porosity of from 30 to 60%.

11. The non-aqueous electrolyte secondary battery according to claim 1, wherein the vibration-absorbing member has a porosity of from 30 to 50%.

12. The non-aqueous electrolyte secondary battery according to claim 1, wherein the vibration-absorbing member has a porosity of from greater than 0% to 40%.

13. The non-aqueous electrolyte secondary battery according to claim 1, wherein the vibration-absorbing member has a porosity of from 30 to 40%.

* * * * *